(12) United States Patent
Huitema et al.

(10) Patent No.: US 12,406,631 B2
(45) Date of Patent: Sep. 2, 2025

(54) MULTI-PARTICLE ELECTROPHORETIC DISPLAY HAVING LOW-FLASH IMAGE UPDATES

(71) Applicant: E INK CORPORATION, Billerica, MA (US)

(72) Inventors: Hjalmar Edzer Ayco Huitema, Lexington, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/753,932

(22) Filed: Jun. 25, 2024

(65) Prior Publication Data

US 2025/0006145 A1    Jan. 2, 2025

Related U.S. Application Data

(60) Provisional application No. 63/523,541, filed on Jun. 27, 2023.

(51) Int. Cl.
| | |
|---|---|
| *G09G 3/34* | (2006.01) |
| *G02F 1/167* | (2019.01) |
| *G02F 1/1675* | (2019.01) |
| *G02F 1/16766* | (2019.01) |
| *G02F 1/1685* | (2019.01) |

(52) U.S. Cl.
CPC .......... *G09G 3/344* (2013.01); *G02F 1/167* (2013.01); *G02F 1/16766* (2019.01); *G02F 1/1685* (2019.01); *G02F 2001/1678* (2013.01); *G09G 2310/0262* (2013.01)

(58) Field of Classification Search
CPC ... G09G 3/344; G09G 2310/026; G02F 1/167
See application file for complete search history.

(56) References Cited

U.S. PATENT DOCUMENTS

| | | |
|---|---|---|
| 4,418,346 A | 11/1983 | Batchelder |
| 5,872,552 A | 2/1999 | Gordon, II et al. |
| 5,930,026 A | 7/1999 | Jacobson |
| 6,017,584 A | 1/2000 | Albert et al. |
| 6,130,774 A | 10/2000 | Albert et al. |
| 6,144,361 A | 11/2000 | Gordon, II et al. |

(Continued)

OTHER PUBLICATIONS

European Patent Office, "International Search Report and Written Opinion", PCT/US2024/035426, Sep. 12, 2024.

(Continued)

*Primary Examiner* — Priyank J Shah
(74) *Attorney, Agent, or Firm* — Brian D. Bean

(57) ABSTRACT

Electrophoretic displays with multi-particle electrophoretic media and improved methods for driving such multi-particle electrophoretic media, especially using active matrix backplanes and controllers. The driving methods use faster gate updates with differential gaps between set of gate updates for a given pixel. The methods are generalizable to any electrophoretic display using push-pull waveforms, and are particularly well-suited for newer multi-particle electrophoretic displays capable of producing four or more colors at each pixel. Using such methods, electrophoretic displays will appear less "flashy" than addressing with conventional row-by-row constant-frame-spacing updating.

35 Claims, 18 Drawing Sheets

(56) References Cited

U.S. PATENT DOCUMENTS

| | | |
|---|---|---|
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,545,797 B2 | 4/2003 | Chen et al. |
| 6,664,944 B1 | 12/2003 | Albert et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,788,452 B2 | 9/2004 | Liang et al. |
| 6,825,970 B2 | 11/2004 | Goenaga et al. |
| 6,864,875 B2 | 3/2005 | Drzaic et al. |
| 6,866,760 B2 | 3/2005 | Paolini, Jr. et al. |
| 6,900,851 B2 | 5/2005 | Morrison et al. |
| 6,914,714 B2 | 7/2005 | Chen et al. |
| 6,922,276 B2 | 7/2005 | Zhang et al. |
| 6,972,893 B2 | 12/2005 | Chen et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,167,155 B1 | 1/2007 | Albert et al. |
| 7,170,670 B2 | 1/2007 | Webber |
| 7,176,880 B2 | 2/2007 | Amundson et al. |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,385,751 B2 | 6/2008 | Chen et al. |
| 7,408,699 B2 | 8/2008 | Wang et al. |
| 7,411,719 B2 | 8/2008 | Paolini, Jr. et al. |
| 7,453,445 B2 | 11/2008 | Amundson |
| 7,492,339 B2 | 2/2009 | Amundson |
| 7,492,505 B2 | 2/2009 | Liang et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,667,684 B2 | 2/2010 | Jacobson et al. |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,684,108 B2 | 3/2010 | Wang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,791,789 B2 | 9/2010 | Albert et al. |
| 7,800,813 B2 | 9/2010 | Wu et al. |
| 7,821,702 B2 | 10/2010 | Liang et al. |
| 7,839,564 B2 | 11/2010 | Whitesides et al. |
| 7,859,742 B1 | 12/2010 | Chiu et al. |
| 7,910,175 B2 | 3/2011 | Webber |
| 7,952,557 B2 | 5/2011 | Amundson |
| 7,952,790 B2 | 5/2011 | Honeyman et al. |
| 7,956,841 B2 | 6/2011 | Albert et al. |
| 7,982,479 B2 | 7/2011 | Wang et al. |
| 7,982,941 B2 | 7/2011 | Lin et al. |
| 8,009,348 B2 | 8/2011 | Zehner et al. |
| 8,040,594 B2 | 10/2011 | Paolini, Jr. et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,159,636 B2 | 4/2012 | Sun et al. |
| 8,174,490 B2 | 5/2012 | Whitesides et al. |
| 8,213,076 B2 | 7/2012 | Albert et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,363,299 B2 | 1/2013 | Paolini, Jr. et al. |
| 8,373,649 B2 | 2/2013 | Low et al. |
| 8,384,658 B2 | 2/2013 | Albert et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,456,414 B2 | 6/2013 | Lin et al. |
| 8,462,102 B2 | 6/2013 | Wong et al. |
| 8,466,852 B2 | 6/2013 | Drzaic et al. |
| 8,503,063 B2 | 8/2013 | Sprague |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,576,470 B2 | 11/2013 | Paolini, Jr. et al. |
| 8,576,475 B2 | 11/2013 | Huang et al. |
| 8,576,476 B2 | 11/2013 | Telfer et al. |
| 8,593,396 B2 | 11/2013 | Amundson et al. |
| 8,593,721 B2 | 11/2013 | Albert et al. |
| 8,605,032 B2 | 12/2013 | Liu et al. |
| 8,605,354 B2 | 12/2013 | Zhang et al. |
| 8,643,595 B2 | 2/2014 | Chung et al. |
| 8,649,084 B2 | 2/2014 | Wang et al. |
| 8,665,206 B2 | 3/2014 | Lin et al. |
| 8,670,174 B2 | 3/2014 | Sprague et al. |
| 8,681,191 B2 | 3/2014 | Yang et al. |
| 8,704,756 B2 | 4/2014 | Lin |
| 8,717,664 B2 | 5/2014 | Wang et al. |
| 8,730,153 B2 | 5/2014 | Sprague et al. |
| 8,786,935 B2 | 7/2014 | Sprague |
| 8,797,634 B2 | 8/2014 | Paolini, Jr. et al. |
| 8,810,525 B2 | 8/2014 | Sprague |
| 8,810,899 B2 | 8/2014 | Sprague et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,928,562 B2 | 1/2015 | Gates et al. |
| 8,928,641 B2 | 1/2015 | Chiu et al. |
| 8,964,282 B2 | 2/2015 | Wang et al. |
| 8,976,444 B2 | 3/2015 | Zhang et al. |
| 9,013,394 B2 | 4/2015 | Lin |
| 9,013,783 B2 | 4/2015 | Sprague |

(56) References Cited

U.S. PATENT DOCUMENTS

| | | |
|---|---|---|
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides et al. |
| 9,170,468 B2 | 10/2015 | Lin et al. |
| 9,171,508 B2 | 10/2015 | Sprague et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,218,773 B2 | 12/2015 | Sun et al. |
| 9,224,338 B2 | 12/2015 | Chan et al. |
| 9,224,342 B2 | 12/2015 | Lin et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,268,191 B2 | 2/2016 | Paolini, Jr. et al. |
| 9,269,311 B2 | 2/2016 | Amundson |
| 9,279,906 B2 | 3/2016 | Kang |
| 9,285,649 B2 | 3/2016 | Du et al. |
| 9,293,511 B2 | 3/2016 | Jacobson et al. |
| 9,299,294 B2 | 3/2016 | Lin et al. |
| 9,341,916 B2 | 5/2016 | Telfer et al. |
| 9,360,733 B2 | 6/2016 | Wang et al. |
| 9,361,836 B1 | 6/2016 | Telfer et al. |
| 9,373,289 B2 | 6/2016 | Sprague et al. |
| 9,383,623 B2 | 7/2016 | Lin et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,423,666 B2 | 8/2016 | Wang et al. |
| 9,459,510 B2 | 10/2016 | Lin |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,527 B2 | 12/2016 | Chan et al. |
| 9,513,743 B2 | 12/2016 | Sjodin et al. |
| 9,514,667 B2 | 12/2016 | Lin |
| 9,541,814 B2 | 1/2017 | Lin et al. |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,671,668 B2 | 6/2017 | Chan et al. |
| 9,672,766 B2 | 6/2017 | Sjodin |
| 9,691,333 B2 | 6/2017 | Cheng et al. |
| 9,697,778 B2 | 7/2017 | Telfer et al. |
| 9,721,495 B2 | 8/2017 | Harrington et al. |
| 9,740,076 B2 | 8/2017 | Paolini et al. |
| 9,759,980 B2 | 9/2017 | Du et al. |
| 9,792,861 B2 | 10/2017 | Chang et al. |
| 9,792,862 B2 | 10/2017 | Hung et al. |
| 9,812,073 B2 | 11/2017 | Lin et al. |
| 9,921,451 B2 | 3/2018 | Telfer et al. |
| 9,922,603 B2 | 3/2018 | Lin |
| 9,966,018 B2 | 5/2018 | Gates et al. |
| 10,032,419 B2 | 7/2018 | Lin et al. |
| 10,162,242 B2 | 12/2018 | Wang et al. |
| 10,209,556 B2 | 2/2019 | Rosenfeld et al. |
| 10,229,641 B2 | 3/2019 | Yang et al. |
| 10,276,109 B2 | 4/2019 | Crounse et al. |
| 10,319,313 B2 | 6/2019 | Harris et al. |
| 10,339,876 B2 | 7/2019 | Lin et al. |
| 10,353,266 B2 | 7/2019 | Bouchard et al. |
| 10,444,553 B2 | 10/2019 | Laxton |
| 10,467,984 B2 | 11/2019 | Buckley et al. |
| 10,475,399 B2 | 11/2019 | Telfer et al. |
| 10,514,583 B2 | 12/2019 | Zhang |
| 10,593,272 B2 | 3/2020 | Telfer et al. |
| 10,657,869 B2 | 5/2020 | Telfer et al. |
| 10,672,350 B2 | 6/2020 | Amundson et al. |
| 10,678,111 B2 | 6/2020 | Telfer et al. |
| 10,832,622 B2 | 11/2020 | Emelie et al. |
| 11,049,463 B2 | 6/2021 | Lin et al. |
| 11,640,803 B2 | 5/2023 | Lin et al. |
| 11,686,989 B2 | 6/2023 | Telfer et al. |
| 11,922,893 B2 | 3/2024 | Crounse et al. |
| 2003/0102858 A1 | 6/2003 | Jacobson et al. |
| 2004/0246562 A1 | 12/2004 | Chung et al. |
| 2005/0129526 A1 | 6/2005 | Dukhin et al. |
| 2005/0253777 A1 | 11/2005 | Zehner et al. |
| 2006/0158572 A1 | 7/2006 | Zhou et al. |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048970 A1 | 2/2008 | Drzaic et al. |
| 2008/0136774 A1 | 6/2008 | Harris et al. |
| 2008/0303780 A1 | 12/2008 | Sprague et al. |
| 2009/0174651 A1 | 7/2009 | Jacobson et al. |
| 2009/0225398 A1 | 9/2009 | Duthaler et al. |
| 2009/0322721 A1 | 12/2009 | Zehner et al. |
| 2010/0156780 A1 | 6/2010 | Jacobson et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0043543 A1 | 2/2011 | Chen et al. |
| 2011/0063314 A1 | 3/2011 | Chiu et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2011/0298779 A1 | 12/2011 | Chen et al. |
| 2012/0001957 A1 | 1/2012 | Liu et al. |
| 2012/0098740 A1 | 4/2012 | Chiu et al. |
| 2012/0326957 A1 | 12/2012 | Drzaic et al. |
| 2013/0063333 A1 | 3/2013 | Arango et al. |
| 2013/0242378 A1 | 9/2013 | Paolini, Jr. et al. |
| 2013/0249782 A1 | 9/2013 | Wu et al. |
| 2013/0278995 A1 | 10/2013 | Drzaic et al. |
| 2014/0009817 A1 | 1/2014 | Wilcox et al. |
| 2014/0055840 A1 | 2/2014 | Zang et al. |
| 2014/0071178 A1* | 3/2014 | Zhang .............. G09G 5/10 |
| | | 359/296 |
| 2014/0078576 A1 | 3/2014 | Sprague |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2014/0362213 A1 | 12/2014 | Tseng |
| 2015/0005720 A1 | 1/2015 | Zang et al. |
| 2015/0118390 A1 | 4/2015 | Rosenfeld et al. |
| 2015/0262255 A1 | 9/2015 | Khajehnouri et al. |
| 2015/0262551 A1 | 9/2015 | Zehner et al. |
| 2015/0268531 A1 | 9/2015 | Wang et al. |
| 2015/0301246 A1 | 10/2015 | Zang et al. |
| 2016/0012710 A1 | 1/2016 | Lu et al. |
| 2016/0048054 A1 | 2/2016 | Danner |
| 2016/0140910 A1 | 5/2016 | Amundson |
| 2016/0180777 A1 | 6/2016 | Lin et al. |
| 2016/0293110 A1* | 10/2016 | Yamazaki ............ G09G 3/344 |
| 2018/0182332 A1* | 6/2018 | Liu ................ G09G 3/3614 |
| 2019/0362680 A1* | 11/2019 | Chang .................. G09G 3/344 |
| 2021/0132459 A1 | 5/2021 | Bull |
| 2022/0082896 A1* | 3/2022 | Telfer ................ G02F 1/16753 |
| 2022/0084473 A1 | 3/2022 | Telfer et al. |
| 2022/0139340 A1* | 5/2022 | Deliwala ............ G02F 1/1679 |
| | | 345/690 |

OTHER PUBLICATIONS

Kitamura, T. et al., "Electrical toner movement for electronic paper-like display", Asia Display/IDW '01, pp. 1517-1520, Paper HCS1-1 (2001).

(56) References Cited

OTHER PUBLICATIONS

Yamaguchi, Y. et al., "Toner display using insulative particles charged triboelectrically", Asia Display/IDW '01, pp. 1729-1730, Paper AMD4-4 (2001).

Dukhin, Andrei S. et al., "Aperiodic capillary electrophoresis method using an alternating current electric field for separation of macromolecules", Electrophoresis, col. 26, pp. 2149-2153 (2005).

\* cited by examiner

WCMY

| | VIEWING SURFACE | | | | | | |
|---|---|---|---|---|---|---|---|
| | | | | Magenta | | Cyan | |
| | | Magenta | | Magenta | Yellow | Magenta | Cyan |
| | Yellow | Yellow | Cyan | White | Cyan | White | Magenta |
| White | White | White | White | Yellow | Magenta | | Yellow |
| Cyan | Cyan | Cyan | Yellow | | Yellow | | White |
| Magenta | Magenta | | | | | | |
| Yellow | | | | | | | |

| | | | | NON-VIEWING SURFACE | | | |
|---|---|---|---|---|---|---|---|
| White | Yellow | Red | Magenta | Blue | Cyan | Green | Black |
| [A] | [B] | [C] | [D] | [E] | [F] | [G] | [H] |

Fig. 5

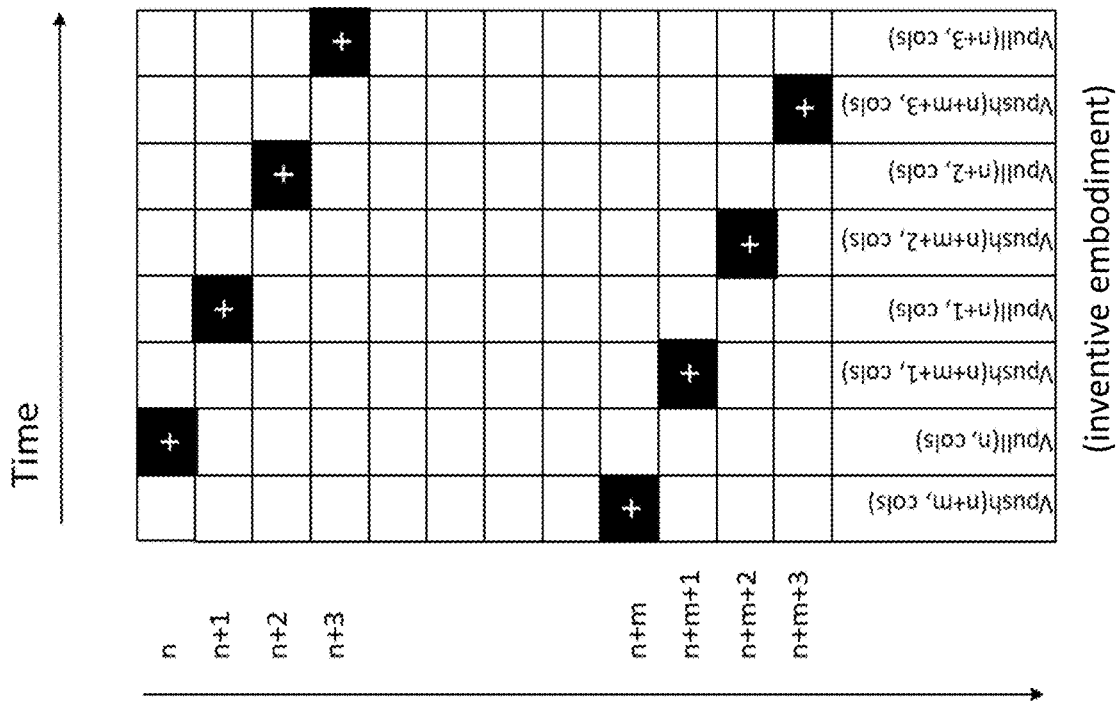
FIG. 16B (inventive embodiment)
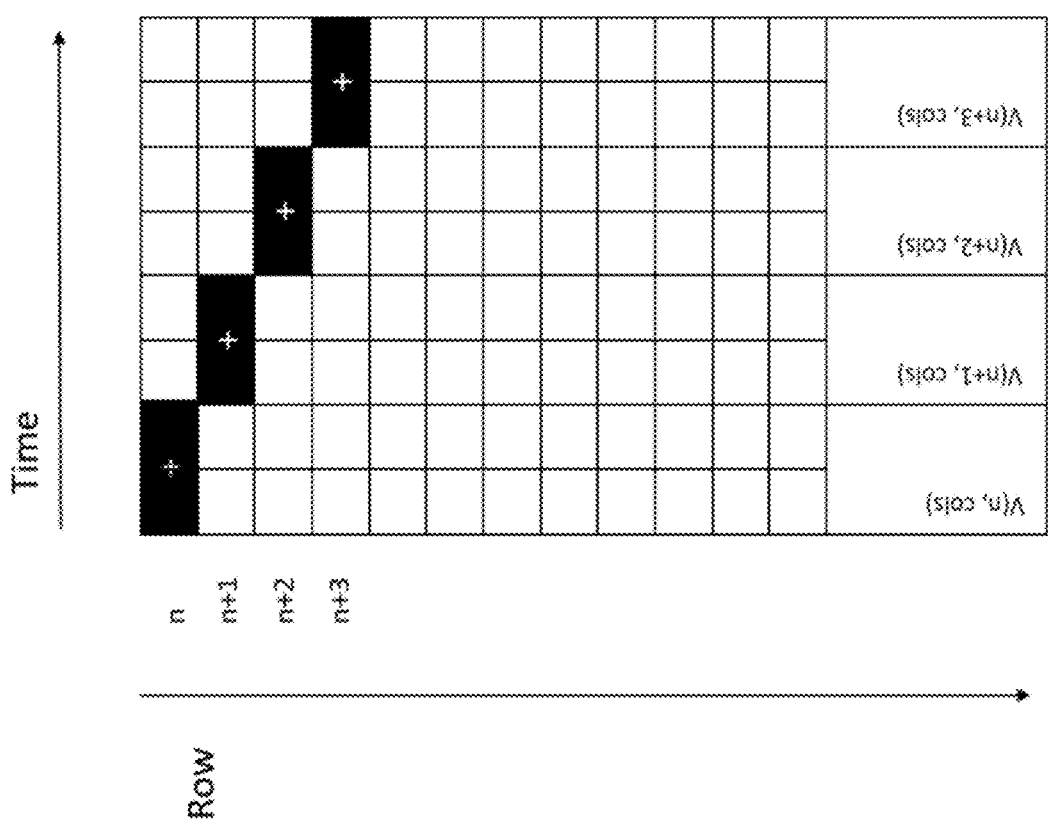
FIG. 16A (conventional addressing)

MULTI-PARTICLE ELECTROPHORETIC DISPLAY HAVING LOW-FLASH IMAGE UPDATES

RELATED APPLICATIONS

This application claims priority to U.S. Provisional Application No. 63/523,541, filed Jun. 27, 2023. All patents and publications disclosed herein are incorporated by reference in their entireties.

BACKGROUND

An electrophoretic display (EPD) changes color by modifying the position of one or more charged colored particles with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders because the electrophoretic displays provide a book-like reading experience, use little power, and allow a user to carry a library of hundreds of books in a lightweight handheld device. Such devices are increasingly being adapted to display of out-of-home (OOH) digital content, such as shelf labels, outdoor advertisement and transportation signage.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels) —either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP™) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353,266, 10,467,984, 10,593,272, and 10,657,869.

As described in the aforementioned patents, the waveforms (i.e., electric fields provided across the electrophoretic medium as a function of time) typically require substantial swings in voltage polarity in a short time. Because of this, in some instances, the colored electrophoretic display "flashes," "flickers," or "looks flashy" when switching between color images. This shortcoming is particularly pronounced when a full-color eReader is quickly switched (i.e., in less than 1 second) between full-color images. A solution to diminish the flashing in multi-particle electrophoretic displays, such as ACEP displays, is presented below.

This invention relates to color electrophoretic displays, especially, but not exclusively, to electrophoretic displays capable of rendering more than two colors using a single layer of electrophoretic material comprising a plurality of colored particles, for example white, cyan, yellow, and magenta particles. In some instances two of the particles will be positively-charged, and one (or two) of the particles will be negatively-charged. In some instances one of the particles will be positively-charged, and three particles will be negatively-charged. In some instances one of the particles will be negatively-charged, and three particles will be positively-charged. The particles may additionally different in the type of charge species on the particle surface and/or the type of polymer(s) functionalized on the surface. The particles may comprise organic or inorganic pigments or dyes.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/

0265561; 2010/0283804; 2011/0063314; 2011/ 0175875; 2011/0193840; 2011/0193841; 2011/ 0199671; 2011/0221740; 2012/0001957; 2012/ 0098740; 2013/0063333; 2013/0194250; 2013/ 0249782; 2013/0321278; 2014/0009817; 2014/ 0085355; 2014/0204012; 2014/0218277; 2014/ 0240210; 2014/0240373; 2014/0253425; 2014/ 0292830; 2014/0293398; 2014/0333685; 2014/ 0340734; 2015/0070744; 2015/0097877; 2015/ 0109283; 2015/0213749; 2015/0213765; 2015/ 0221257; 2015/0262255; 2015/0262551; 2016/ 0071465; 2016/0078820; 2016/0093253; 2016/ 0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6, 144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multi-color electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both.

Electrophoretic displays capable of rendering any color at any pixel location have been described in U.S. Pat. Nos. 10,475,399 and 10,678,111. In the '399 patent, a display is described in which a white (light-scattering) pigment moves in a first direction when addressed with a low applied voltage and in the opposite direction when addressed with a higher voltage. In the '111 patent, a full-color electrophoretic display is described in which there are four pigments: white, cyan, magenta and yellow, in which two of the pigments are positively-charged and two negatively charged. U.S. Patent Publication 2022/0082896 describes a full-color electrophoretic display in which there are four pigments: white, cyan, magenta and yellow, in which the three colored pigments are positively-charged and white pigment negatively charged. Embodiments of the present invention of this type are referred to as CMYW embodiments.

In addition, there are multi-particle display designs in which the color pigments scatter light (i.e., reflective color particles). U.S. Pat. No. 10,339,876 describes a display of this type having black, white and red particles capable of rendering three states. Similar display designs including four pigments can render four different colors, see, e.g. U.S. Pat. No. 9,922,603, or, by using a semi-transparent colored particle, such displays can render six colors, see, e.g., U.S. Pat. No. 11,640,803. Many of the multi-particle display designs using light-scattering particles incorporate lengthy and "flashy" updates, which some viewers find unappealing. The solutions described below can be used to decrease the "flashiness" of the updates in such displays, and in some cases decrease the time for an update.

SUMMARY

Disclosed herein are improved methods of driving full color electrophoretic displays and full color electrophoretic displays using these drive methods. In one aspect, the invention involves an electrophoretic display, which includes a light-transmissive electrode, an active matrix backplane comprising a plurality of pixel electrodes, each pixel electrode being coupled to a thin-film transistor comprising a gate line and a source line, and each pixel electrode being coupled to a storage capacitor, and an electrophoretic medium disposed between the light-transmissive electrode and the active matrix backplane, wherein the electrophoretic medium includes at least three different types of charged pigment particles. The electrophoretic display also includes a controller coupled to a plurality of gate lines of the plurality of pixel electrodes and to a plurality of source lines of the plurality of pixel electrodes, the controller being configured to address the pixel electrodes in a row-by-row fashion. The controller is configured to update an image on the electrophoretic display by performing the following steps: address a first row of pixel electrodes by providing a first gate voltage at a first time; address a second row of pixel electrodes by providing a second gate voltage at a second time; address the first row of pixel electrodes by providing a third gate voltage at a third time; address the second row of pixel electrodes by providing a fourth gate voltage at a fourth time; and address the first row of pixel electrodes by providing a fifth gate voltage at a fifth time, wherein the first, second, third, fourth, and fifth times are not the same, and a time elapsed between the first time and the third time is shorter than a time elapsed between the third time and the fifth time.

In one embodiment, the time elapsed between the third time and the fifth time is at least twice as long as the time elapsed between the first time and the third time. In one embodiment, the time elapsed between the first time and the third time is less than 20 milliseconds, optionally less than 10 milliseconds, optionally around 8 milliseconds. In one embodiment, the controller simultaneously provides a first source voltage to a pixel of the first row of pixel electrodes at the first time and a second source voltage to the pixel of the first row of pixel electrodes at the third time, and the polarity of the first source voltage and the polarity of the second source voltage are opposite. In one embodiment, the magnitude of the first source voltage and the magnitude of the second source voltage are different. In one embodiment, the magnitudes of the first source voltage and the magnitude of the second source voltage are between −15V and +15V, or between −24V and +24V. In one embodiment, the controller simultaneously provides a third source voltage to the pixel of the first row of pixel electrodes at the fifth time. In one embodiment, the first source voltage and the third source voltage have the same polarity and magnitude. In one embodiment, a portion of electrophoretic medium above a pixel electrode in the first row of pixel electrodes and a portion of the electrophoretic medium above a pixel electrode in the second row of pixel electrodes undergo a same color transition when the controller updates the image. In one embodiment, the controller performs the additional following steps: address a third row of pixel electrodes by providing a sixth gate voltage at a sixth time; and address the third row of pixel electrodes by providing a seventh gate voltage at a seventh time, wherein the first, second, third, fourth, fifth, sixth, and seventh times are not equal, and the time elapsed between the first time and the third time is the same as the time elapsed between the sixth time and the seventh time. In one embodiment, there are n rows of pixel electrodes in the active matrix backplane, and the first row of pixel electrodes and the second row of pixel electrodes are separated by n/2 rows of pixel electrodes. In one embodiment, the controller provides at least two separate gate voltages to each and every thin-film transistor of the active matrix backplane between the first time and the fifth time. In one embodiment, the electrophoretic medium includes a reflective white particle and at least one subtractive color particle or a reflective white particle and at least one reflective color particle. In one embodiment, the electrophoretic medium includes a fourth type of electrophoretic particle. In one embodiment, two of the types of particles are negatively charged and two of the types of particles are positively charged, or wherein one of the types of particles is negatively charged and three of the types of particles are positively charged, or wherein three of the types of particles are negatively charged and one of the types of particles is positively charged. In one embodiment, the electrophoretic medium is encapsulated in microcapsules or microcells.

BRIEF DESCRIPTION OF DRAWINGS

FIG. 5 illustrates the preferred position of each of the four sets of particles to produce eight standard colors in a white-cyan-magenta-yellow (WCMY) four-particle electrophoretic display, wherein the white particles are reflective and the cyan, magenta, and yellow particles are absorptive.

FIG. 9 illustrates that overall length of the transition to one of the limit cycle colors in the system (i.e., magenta, green, yellow, or blue) is roughly the same no matter the duration of the individual pulses that comprise a dipole.

FIG. 16A depicts state-of-the-art row-by-row driving for contrast to an embodiment of the invention, as depicted in FIG. 16B.

FIG. 16B provides greater details of the drive scheme depicted in FIG. 14.

DETAILED DESCRIPTION

Figure 1A:
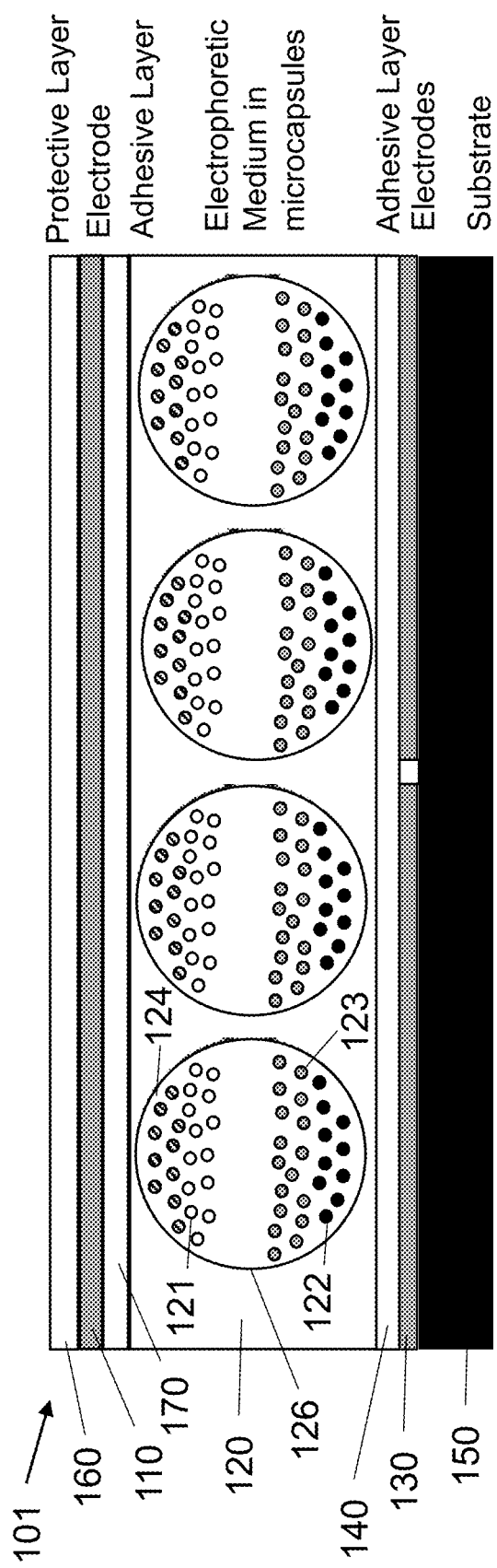
FIG. 1A is a representative cross-section of a four-particle electrophoretic display wherein the electrophoretic medium is encapsulated in capsules. The construction of FIG. 1A can be used for multi-particle electrophoretic media with both reflective and subtractive pigment particles.

The invention includes electrophoretic displays with multi-particle electrophoretic media, and improved methods for driving such multi-particle electrophoretic media. Displays of the invention typically include an active matrix backplane of pixel electrodes controlled with thin-film transistors, wherein each pixel electrode is also couple to a storage capacitor. While the driving methods of displays are generalizable to any electrophoretic display using push-pull waveforms, the inventive displays are preferably used for driving more complicated electrophoretic media, e.g., which require precise control of three, four, or more particles simultaneously. The benefit is that displays incorporating the disclosed drive schemes will typically appear less "flashy" than addressing with conventional row-by-row constant-frame-spacing updating, which has been the state of the art for decades. Such displays may include multiple subtractive colored electrophoretic particle and/or multiple reflective colored electrophoretic particles. In a preferred embodiment, the electrophoretic medium includes a white particle and cyan, yellow, and magenta subtractive primary colored particles, i.e., a WCMY system.

Methods for fabricating an electrophoretic display including four (or more) particles have been discussed in the prior art. The electrophoretic fluid may be encapsulated in microcapsules or incorporated into microcell structures that are thereafter sealed with a polymeric layer. The microcapsule or microcell layers may be coated or laminated to a plastic substrate or film bearing a transparent coating of an electrically conductive material. Alternatively, the microcapsules may be coated onto a light transmissive substrate or other electrode material using spraying techniques. (See U.S. Pat. No. 9,835,925, incorporated by reference herein). The resulting assembly may be laminated to a backplane bearing pixel electrodes using an electrically conductive adhesive. The assembly may alternatively be attached to one or more segmented electrodes on a backplane, wherein the segmented electrodes are driven directly.

This invention provides an architecture and method for using a thin film transistor array to address an electrophoretic display with dipoles. In a first embodiment both pulses of a dipole are provided at the (conventional) frame rate of the display, unlike the prior art methods that require a minimum of one frame's duration for each pulse in the dipole. In this embodiment of the present invention, the total length of the dipole is equal to one conventional frame's duration. In a second embodiment the rows of the display are split into two groups, each of which is scanned twice to accomplish one full update frame. The first embodiment of the display allows flexible choice of the ratio between the lengths of the "push" and "pull" pulses in a dipole, while in the second embodiment the ratio of "push" to "pull" durations is 3:1. Electrophoretic compositions are provided allowing addressing of the display to produce a colored image without visible flickering or flashing.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes, photonic crystals, quantum dots, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 µm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering". Specific examples of suitable particles are disclosed in U.S. Pat. No. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as $TiO_2$, $ZrO_2$, ZnO, $Al_2O_3$, $Sb_2O_3$, $BaSO_4$, $PbSO_4$ or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

Figure 1B:
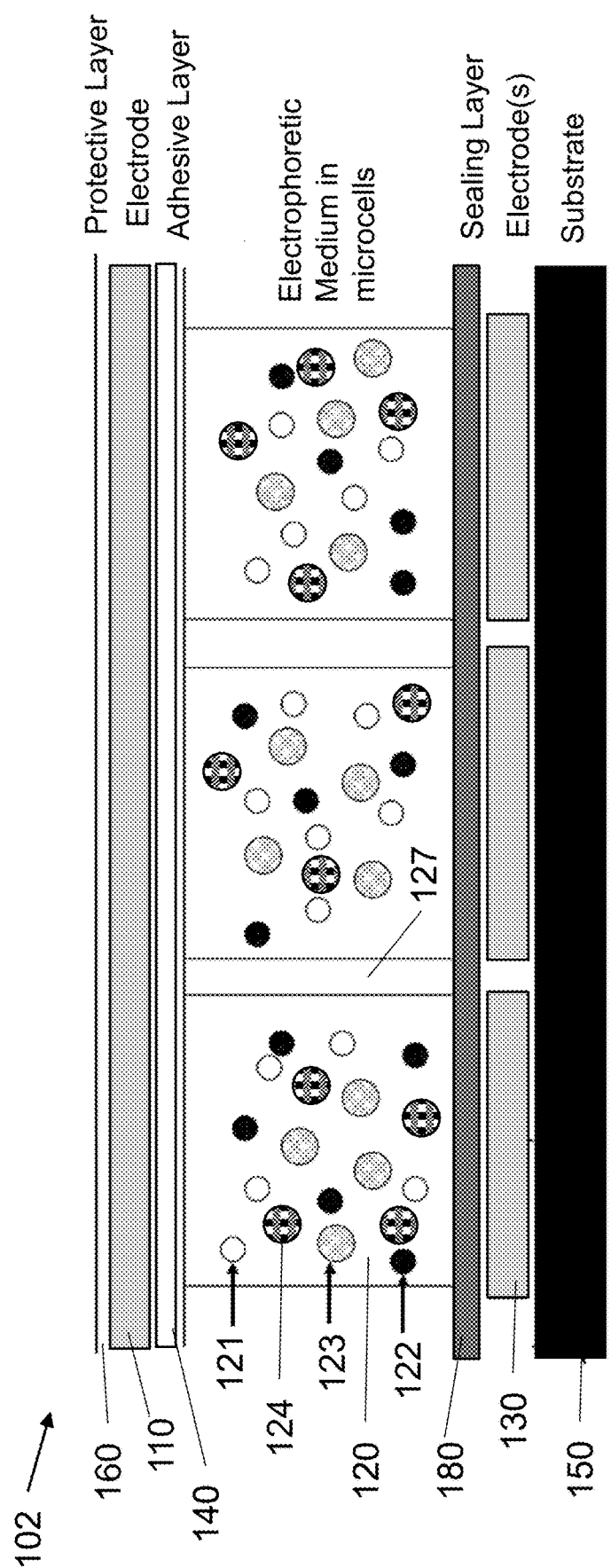
FIG. 1B is a representative cross-section of a four-particle electrophoretic display wherein the electrophoretic medium is encapsulated in microcells. The construction of FIG. 1B can be used for multi-particle electrophoretic media with both reflective and subtractive pigment particles.

As shown in FIG. 1A and FIG. 1B, an electrophoretic display (101, 102) typically includes a top transparent electrode 110, an electrophoretic medium 120, and a bottom electrode 130, which is often a pixel electrode of an active matrix of pixels controlled with thin film transistors (TFT). In the electrophoretic media 120 described herein, there are four different types of particles, 121, 122, 123, and 124, however more (or fewer) particle sets can be used with the methods and displays described herein. For example the techniques of the invention could be used with a set of three types of particles, for example white, black, and red, wherein one of the three different types of particles has a charge magnitude lower than the other two types of particles. In some instances two of the particles will be positively-charged, and one (or two) of the particles will be negatively-charged. In some instances one of the particles will be positively-charged, and three particles will be negatively-charged. In some instances one of the particles will be negatively-charged, and three particles will be positively-charged. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1B) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1A, the electrophoretic display may include a light-transmissive electrode, an electrophoretic medium, and a plurality of rear pixel electrodes. To produce a high-resolution display, e.g., for displaying images, each pixel electrode 130 is individually-addressable without interference from adjacent pixels so that an image file is faithfully reproduced on the display. One way to achieve this objective is to provide an array of non-linear elements, such as transistors or diodes, with at least one non-linear element associated with each pixel, to produce an "active matrix" display. (See FIG. 2.) An addressing or pixel electrode 130, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor.

Conventionally, in high resolution arrays, the pixels are arranged in a two-dimensional array of rows and columns, such that any specific pixel is uniquely defined by the intersection of one specified row and one specified column. (See FIG. 3) The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are typically connected to a row driver (gate driver, gate controller), which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are typically connected to column drivers (source driver, source controller), which place upon the various column electrodes voltages selected to drive the pixels in the selected row to their desired optical states. (The aforementioned voltages are with respect to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner. The time between successive updates of a particular row in the display is known as a "frame." Thus, a display that is updated at 60 Hz has frames that are 16 msec in length. A variety of frame times can be used with electrophoretic displays, such as an 8 msec frame, a 12 msec frame, a 5 msec frame, etc. In some instances, the frame is greater than 1 msec and less than 30 msec.

It should be noted that the magnitude of the voltage that can be provided in such row-column driving can be limited by the materials from which the non-linear element, e.g., thin film transistor, is fabricated. In many embodiments the semiconductor material is silicon, especially amorphous silicon, which is able to control driving voltages on the order of ±15 V. In other embodiments, the semi-conductor of the thin-film-transistor may be a metal oxide, such indium gallium zinc oxide (IGZO), which allows for a wider range of driving voltages, e.g., up to ±30 V e.g., as described in U.S. Patent Publication No. US 2022/0084473. This design feature is particularly pertinent when driving waveforms to sort the pigments of a multi-particle system. In such systems, it is beneficial to provide at least five voltage levels (high positive, low positive, zero, low negative, high negative), and with higher total voltages, it is easier to separate the particles. For greater details, see U.S. Patent Publication 2021-0132459.

Figure 2:
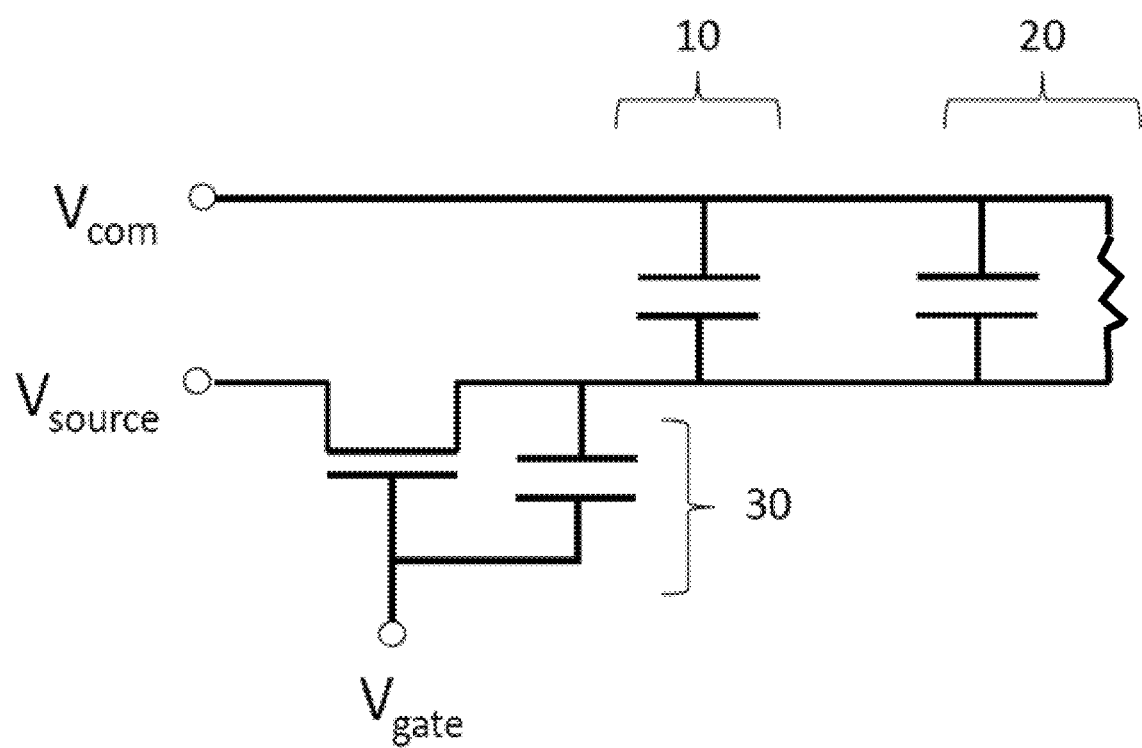
FIG. 2 illustrates an exemplary equivalent circuit of a single pixel of an electrophoretic display that uses an active matrix backplane of pixel electrodes coupled to a storage capacitor.

FIG. 2 of the accompanying drawings depicts an exemplary equivalent circuit of a single pixel of an electrophoretic display. As illustrated, the circuit includes a storage capacitor 10 formed between a pixel electrode (element 130 of FIGS. 1A and 1B) and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. [In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.]

In a conventional electrophoretic display using an active matrix backplane, each pixel electrode has associated therewith a capacitor electrode (storage capacitor) such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 3:
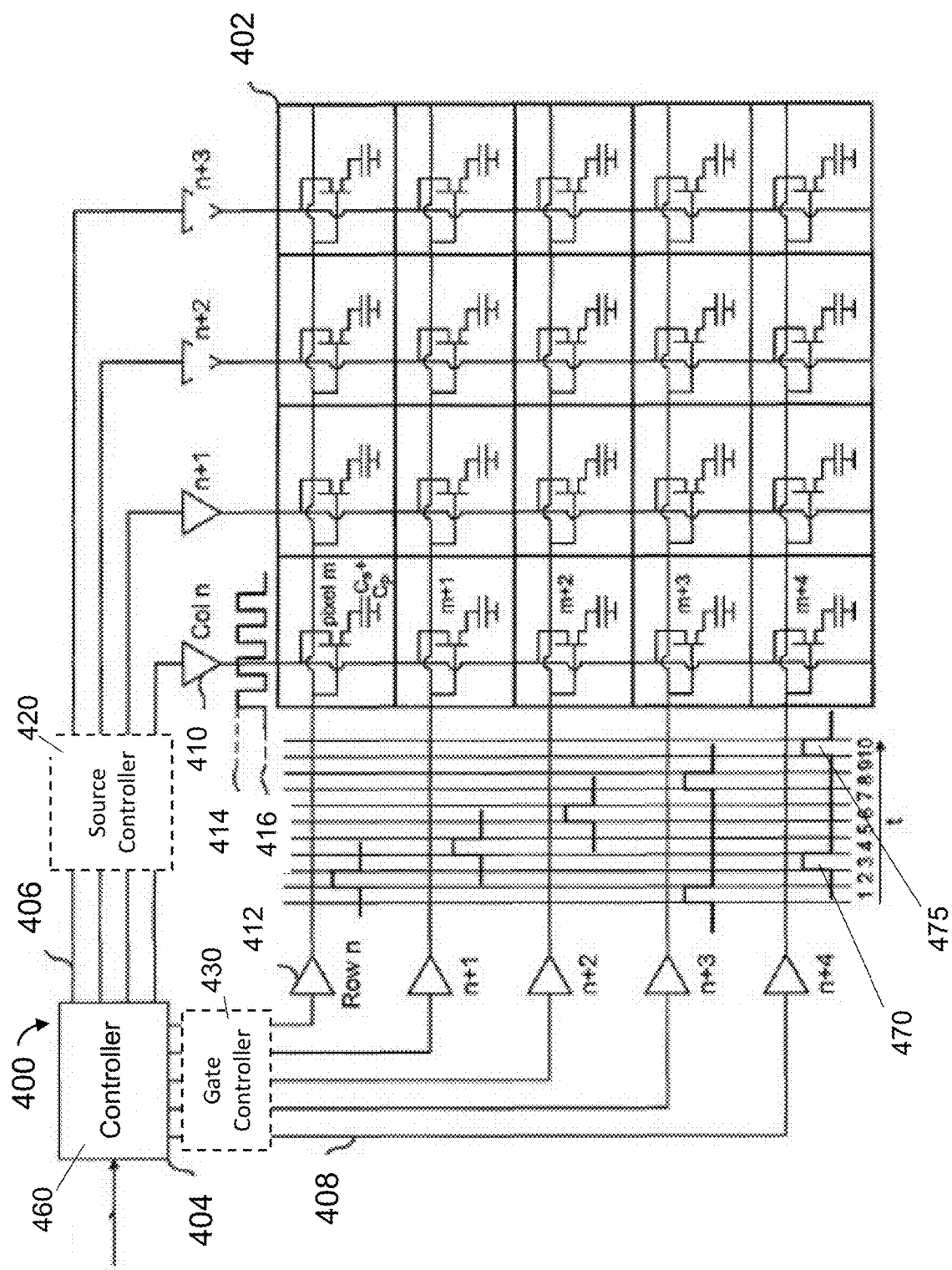
FIG. 3 is a diagrammatic view of an exemplary driving system for controlling voltages provided to pixel electrodes in an active matrix device. The resulting driving voltages can be used to set an optical state of a multi-particle electrophoretic medium.

Additional details of the row-column addressing used in an "active matrix" display are shown in FIG. 3. An addressing or pixel electrode, which addresses one pixel, is fabricated on a substrate 402 and connected to the appropriate voltage sources 404 and 406 through the associated non-linear element. It is understood that the voltage sources 404 and 406 may originate from separate circuit elements or the voltages can be delivered with the assistance of a single power supply and a power management integrated circuit (PMIC). In some instances an intervening source controller 420 is used to control the supplied voltage, however in other embodiments the controller 460 is configured to control the entire addressing process, including coordinating the gate and source lines. It is also to be understood that FIG. 3 is an illustration of the layout of an active matrix backplane 400 but that, in reality, the active matrix has depth and some elements, e.g., the TFT, may actually be underneath the pixel electrode, with a via providing an electrical connection from the drain to the pixel electrode above.

Conventionally, in high resolution arrays, the pixels are arranged in a two-dimensional array of rows and columns, such that any specific pixel is uniquely defined by the intersection of one specified row and one specified column. The sources of all the transistors in each column are connected to a single column (scan) line 406, while the gates of all the transistors in each row are connected to a single row (gate) line 408; again the assignment of sources to rows and gates to columns is conventional but essentially arbitrary, and could be reversed if desired. The gate lines 408 are optionally connected to a gate controller 430, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column scan lines 406 are optionally connected to a source controller 420, which place upon the various scan lines 406 voltages selected to drive the pixels in the selected row to their desired optical states. (The aforementioned voltages are relative to a common top electrode, and is not shown in FIG. 3.) With conventional driving, after a pre-selected interval known as the "line address time" the selected row is deselected, the next row is selected, and the voltages on the column drivers are changed so that the next line of the display is written. In "typical" backplane driving, this process is repeated in a linear fashion so that the entire display is written in a row-by-row manner. As shown in FIG. 3, the temporal spacing between gate voltage pulses of respective frames is typically constant, and represent the rhythm of line by line addressing. Notably, the invention does not implement an even spacing between respective gate voltage pulses for a given address row of pixel electrodes.

Figure 4:
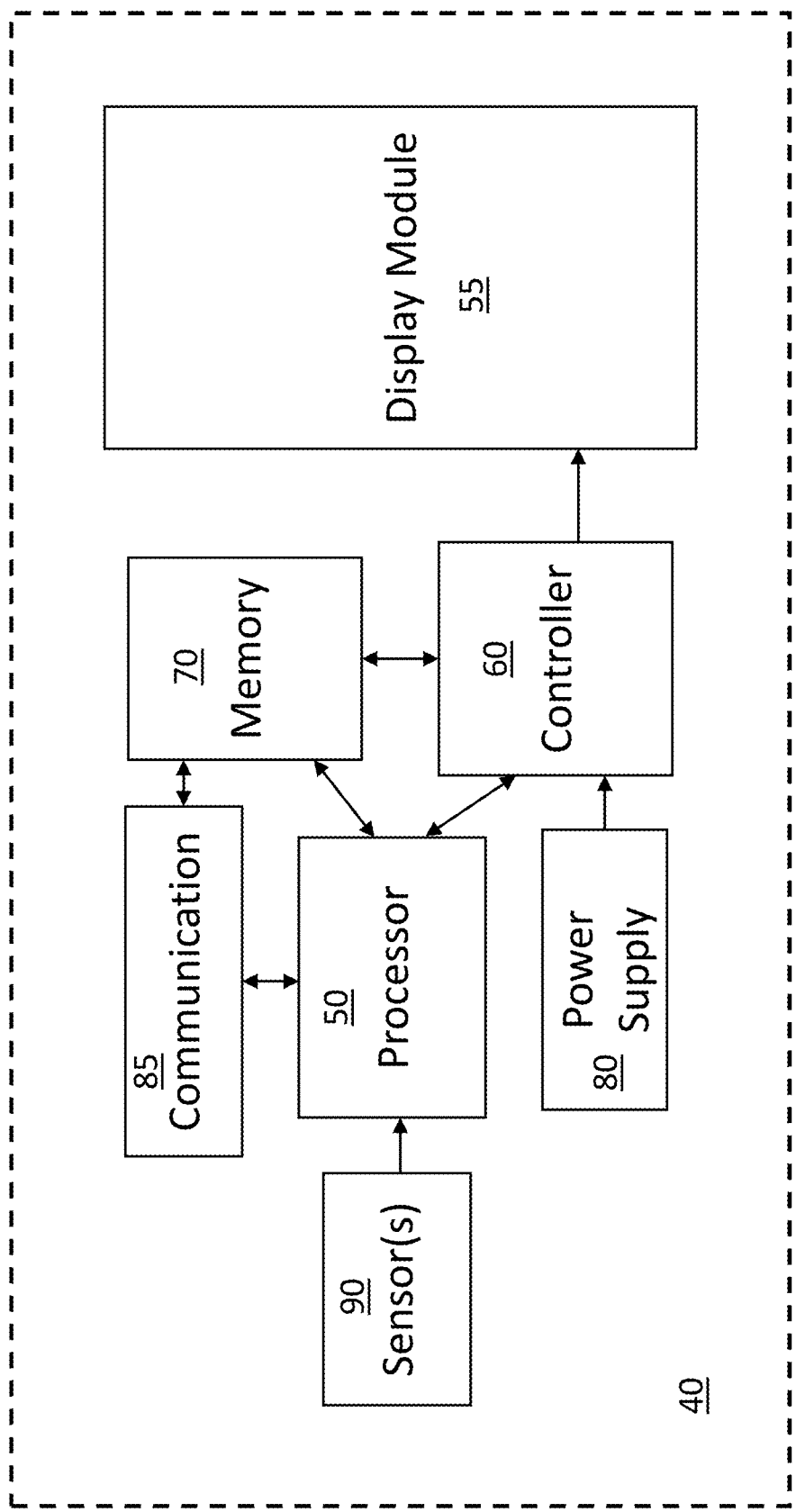
FIG. 4 illustrates an exemplary electrophoretic display that includes a display module. The electrophoretic display also includes a processor, memory, one or more power supplies, and a controller. The electrophoretic display may also include sensors to allow the electrophoretic display to adjust operational parameters based upon the ambient environment, e.g., temperature and illumination.

The active matrix backplane described with respect to FIG. 3 is coupled to an electro-optic medium, e.g., as illustrated in FIGS. 1A and 1B, and typically sealed to create a display module 55, as shown in FIG. 4. Such a display module 55 becomes the focus of an electrophoretic display 40. The electrophoretic display 40 will typically include a processor 50, which is configured to coordinate the many functions relating to displaying content on the display module 55, and to transform "standard" images, such as sRGB images to a color regime that best duplicates the image on the display module 55. Of course, if the electrophoretic display is being used as a sensor or counter, the content may relate to other inputs. The processor is typically a mobile processor chip, such as made by Freescale or Qualcomm, although other manufacturers are known. The processor is in frequent communication with the non-transitory memory 70, from which it pulls image files and/or look up tables to perform the color image transformations described below. The non-transitory memory 70 may also include gate driving instructions to the extent that a particular color transition may require a different gate driving pattern. The electrophoretic display 40 may have more than one non-transitory memory chip. The non-transitory memory 70 may be flash memory. Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The electrophoretic display 40 may additionally include communication 85, which may be, for example, WIFI protocols or BLUETOOTH, and allows the electrophoretic display 40 to receive images and instructions, which also may be stored in memory 70. The electrophoretic display 40 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

As shown in FIG. 5, the Advanced Color E-Paper electrophoretic composition ACEP (e.g., comprising a WCMY particle system) in principle works similarly to printing on bright white paper in that the viewer only sees those colored pigments that are on the viewing side of the white pigment (i.e., the only pigment that scatters light). In FIG. 5, it is assumed that the viewing surface of the display is at the top (as illustrated), i.e., a user views the display from this direction, and the illumination light is also incident from this direction. In FIG. 5 the light scattering particle is assumed to be the white pigment. This light-scattering white particle forms a white reflector against which any particles above the white particles (as illustrated in FIG. 5) are viewed. A portion of the incident light passes through the subtractive particles, is reflected from the white particles below the subtractive particles, passes back through these particles and emerges from the display. A different portion of the incident light is absorbed by the subtractive particles. Thus, the particles above the white particles may absorb various colors and the color appearing to the user is that resulting from the combination of particles above the white particles. Any particles disposed below the white particles (behind from the user's point of view) are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 5), there are no particles above the white particles and the pixel simply displays a white color. When a single particle is above the white particles, the color of that single particle is displayed, yellow, magenta and cyan in Situations [B], [D] and [F] respectively in FIG. 5. When two particles lie above the white particles, the color displayed is a combination of those of these two particles; in FIG. 5, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 5), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

FIG. 5 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 5.)

Figure 6A:
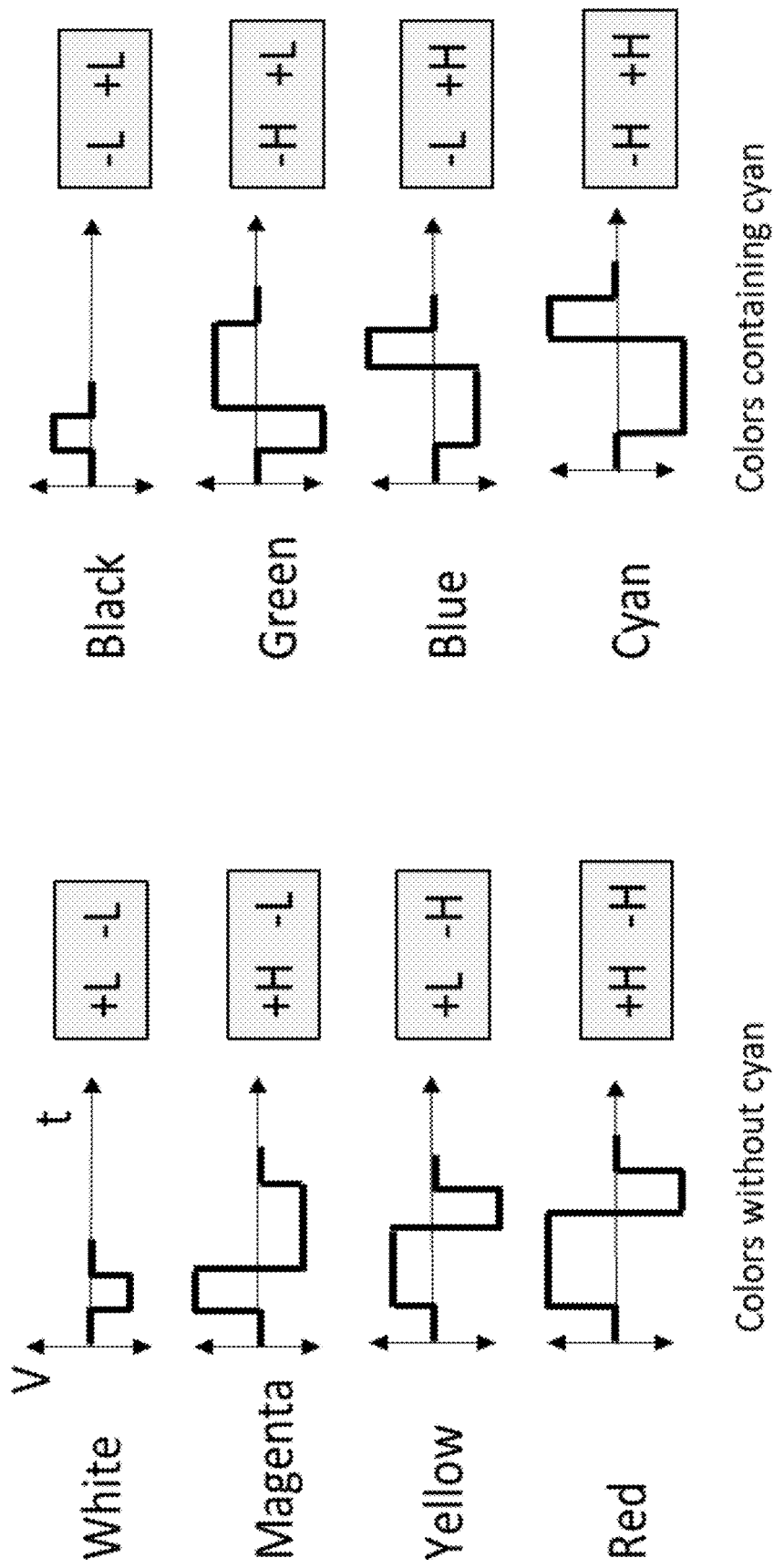
FIG. 6A shows exemplary push-pull drive schemes for addressing an electrophoretic medium including three subtractive (cyan, yellow, magenta) particles and a scattering (white) particle.

FIG. 6A shows typical waveforms (in simplified form) used to drive a four-particle WCMY electrophoretic display system described above. Such waveforms have a "push-pull" structure: i.e., they consist of a dipole comprising two pulses of opposite polarity. Typically, each dipole has a pulse of voltage $V_1$ applied for a time ti followed by a voltage $V_2$ applied for time $t_2$. The dipole is impulse balanced when $V_1 t_1 + V_2 t_2 = 0$. The magnitudes and lengths of these pulses determine the color obtained. At a minimum, there should be five such voltage levels. FIG. 6A shows high and low positive and negative voltages, as well as zero volts. Typically, "low" (L) refers to a range of about 5-15V, while "high" (H) refers to a range of about 15-30V. In general, the higher the magnitude of the "high" voltages, the better the color gamut achieved by the display. In some instances, especially where more colors are required, medium voltages are also included. The "medium" (M) level is typically around 15V; however, the value for M will depend somewhat on the composition of the particles, as well as the environment of the electrophoretic medium.

Notably with the dipole waveforms of FIG. 6A, the dipoles used to provide magenta, yellow, green and blue colors are at least approximately impulse balanced. On the other hand, it is not necessary to use dipole addressing to produce black and white. Simple monopole pulses in either direction will move the oppositely-charged colored and white pigments towards and away from the viewing surface, and thus the display behaves under these circumstances like a conventional display containing black and white pigments. Additionally, because these monopole pulses are not DC balanced, additional charge clearing pulses must be incorporated into the device drive protocol, either at the beginning or end of an image update, or at the end of an extended unbalanced drive sequence, such as may happen when scrolling text. Dipole addressing can break the symmetry even when the waveform is impulse balanced overall, however. For example, one can have $\int V\, dt = 0$, and $\int V^3\, dt \neq 0$. See, e.g., Dukhin A S, Dukhin S S, "Aperiodic capillary electrophoresis method using an alternating current electric field for separation of macromolecules." *Electrophoresis*, 2005 June; 26(11):2149-53. Then, as long as pigment mobility depends on applied electric field, this kind of waveform can result in overall pigment drift.

Figure 6B:
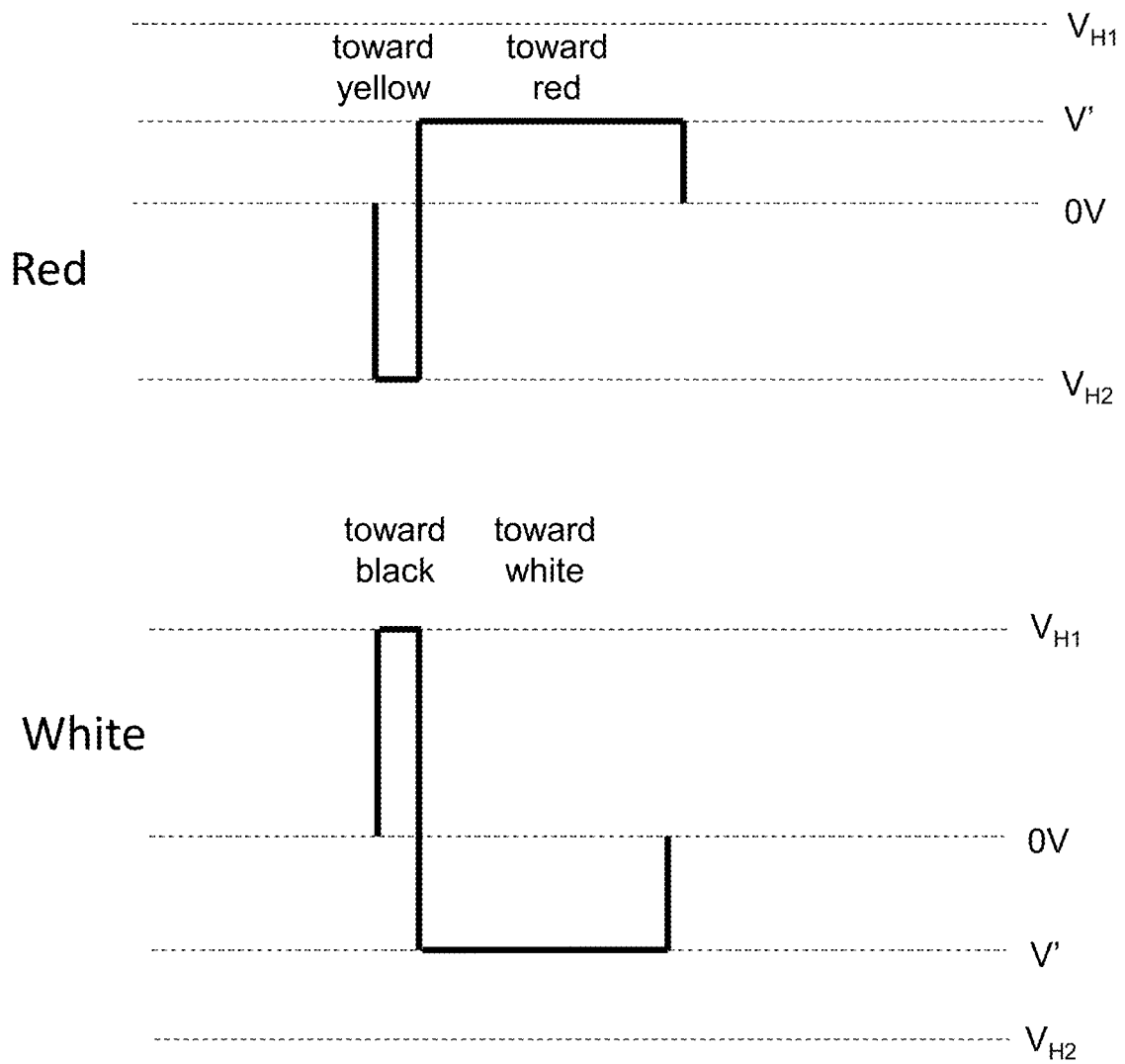
FIG. 6B shows exemplary push-pull drive schemes for addressing an electrophoretic medium including one absorptive (black) particle, two reflective (red, yellow) particles, and a scattering (white) particle.

FIG. 6B shows two typical push-pull waveforms that are used to cause the color of the lesser charged particles to appear at the viewing surface for a four particle system including a scattering white particle, an absorptive black particle, and two colored scattering particles (yellow and red). See, e.g., U.S. Pat. No. 10,339,876. In the instance depicted in FIG. 6B, the yellow particle is highly charged with a negative polarity and the white particle has lower charge with a negative polarity. The black particle is highly charged with a positive polarity and the red particle has lower charge and a positive polarity.

Figure 7:
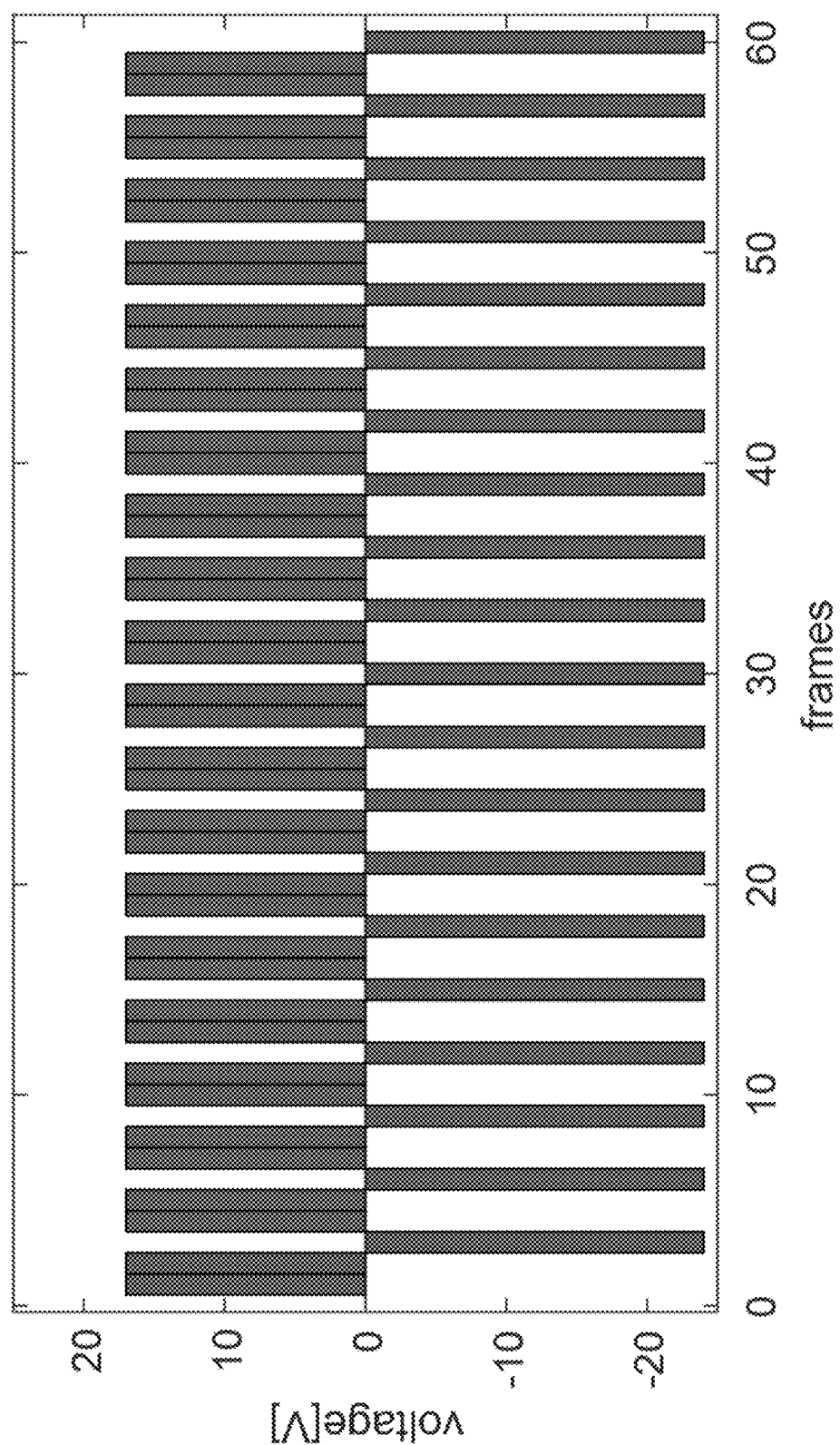
FIG. 7 depicts a "typical" driving waveform delivered to a pixel electrode during a single update from a first color to a second color. Notably, the waveform includes repeating push-pull voltages.

As can be seen in FIGS. 6A-6B, typically one pulse in a dipole used to produce a particular color is of shorter duration than the other. Furthermore, although FIGS. 6A and 6B show the simplest push-pull waveforms (dipoles) required to form colors, it will be appreciated that practical waveforms typically require multiple repetitions of these patterns, as shown in FIG. 7. The repetitive dipoles are the primary source of flicker in the display as the pigments are driven first in one direction and then in the other. The appearance of the transition from one color to another will be jarring if the frequency of this flicker is too low. Therefore it is preferred that the length of any pulse in a dipole used to address a display of the invention be less than about 17 milliseconds, corresponding to the human threshold for perception of a flash (about 60 Hz). Unfortunately, with typical row-by-row driving, wherein each frame is about 10-20 milliseconds, pulses that span two frames are typically visible and the overall update experience deemed "flashy."

Nonetheless, when differential pigment mobility is due to a field effect, it is not necessary to drive the pigments across the whole width of the cavity containing them. This provides an option for switching (at least some) of the colors without producing (human-perceptible) flashing. Such a condition occurs, for example, when field dependent mobility is a polarization effect. In this case, because the pigments are much smaller than the cavity containing them, the pigment polarization is faster than the polarization of the whole cell. In this case it is possible to choose a higher frequency for pigment sorting than would be required to switch the pigments from one extreme state to another, and by doing so remove flashing that is visible to humans.

In conventional active matrix addressing, the duration of one pulse of a dipole cannot be shorter than the duration of one frame (frame=time to address every pixel from one corner of the active matrix to the opposite corner, wherein each row is addressed in a sequential fashion, the time to address each row is the same, and no row is re-addressed before every row in the display is addressed only once). Accordingly, the longer pulse of a dipole must be an integer multiple of the frame duration in length (assuming that the display is, as is typical, addressed at a constant frame rate). If the ratio between the longer and the shorter pulses in a dipole is r, and the dipole time is required to be shorter than about 17 ms (about the limit of perceptible flashing) then the scanning frequency of the display must be higher than 1000/17 multiplied by r+1. For example, if the longer pulse is twice as long as the shorter pulse the scan rate of the display must be at least 3000/17=about 177 Hz. Higher ratios of pulse lengths would require even higher frame rates. Unfortunately, in the current state of the art, providing such high frame rates incurs high cost of electronics and high power consumption. Such advanced electronics are typically disfavored in consumer electronics, where sales are a strongly influenced by price.

Referring again to FIG. 6A, three different types of color transition may be identified in the push pull waveforms for the WCMY system. These are referred to herein as "rail states", "rail bounce states" and "limit cycle states". The term "rail" as used in the art of electrophoretic displays refers to the fact that pigments are moved using an electric field between two walls of a cavity. When a pigment's motion is constrained by one of these walls it is said to be at a rail, and the process of moving it to that position is called "railing". The two rail states of the WCMY system correspond to black (in which all three subtractive color pigments are at the viewing surface and the white pigment is at the opposite rail) and white (in which the positions of the pigments are reversed).

In a "rail bounce state" it is necessary to arrange the pigments in one of the two rail states and then reverse the direction of the electric field for a relatively short time. The colored pigment with the highest mobility will be the one that moves the fastest through the white pigment and therefore the one that is modulated during this second pulse. In the present invention the rail bounce states are red and cyan. Red is achieved by first switching the display into the black rail state (using a positive pulse) and then pulling back the cyan pigment using a negative pulse that is not long enough to significantly switch the magenta or yellow pigments. Cyan is achieved by inverting this waveform, first providing the white rail state (in which the three colored pigments are at the rear rail) and then using a short positive pulse to bring the cyan pigment to the viewing surface. Because a rail bounce state requires first railing all three colored pigments in a first pulse, this pulse cannot be shorter than the time required to move the slowest pigment across the width of the cavity containing the electrophoretic fluid. In order to avoid visible flicker when making the rail bounce colors, therefore, the time required to traverse the cavity by the slowest pigment must be less than 17 ms. In some embodiments of the invention (in which the cavity is very narrow) this may be possible, but in other embodiments it is not. In these cases a flicker will be present when accessing the rail bounce states that may be dealt with by, for example, interlacing the update of pixels in the display.

The "limit cycle" colors of the invention are magenta and yellow and their inverse states, green and blue. These colors are obtained using dipole addressing, but in contrast to the rail bounce states the length of pulses in the dipoles do not need to be long enough for any pigment to traverse the cavity containing the electrophoretic fluid. In fact, the longest pulses in a sequence of dipoles used to provide the limit cycle colors may be as short as about 2 milliseconds (or possibly shorter still—the apparatus used by the present inventors to address experimental displays does not allow shorter pulses). Note that the yellow pigment may be relatively weakly positively or negatively charged and still behave in the manner illustrated in FIGS. 8A-9.

Figure 8A:
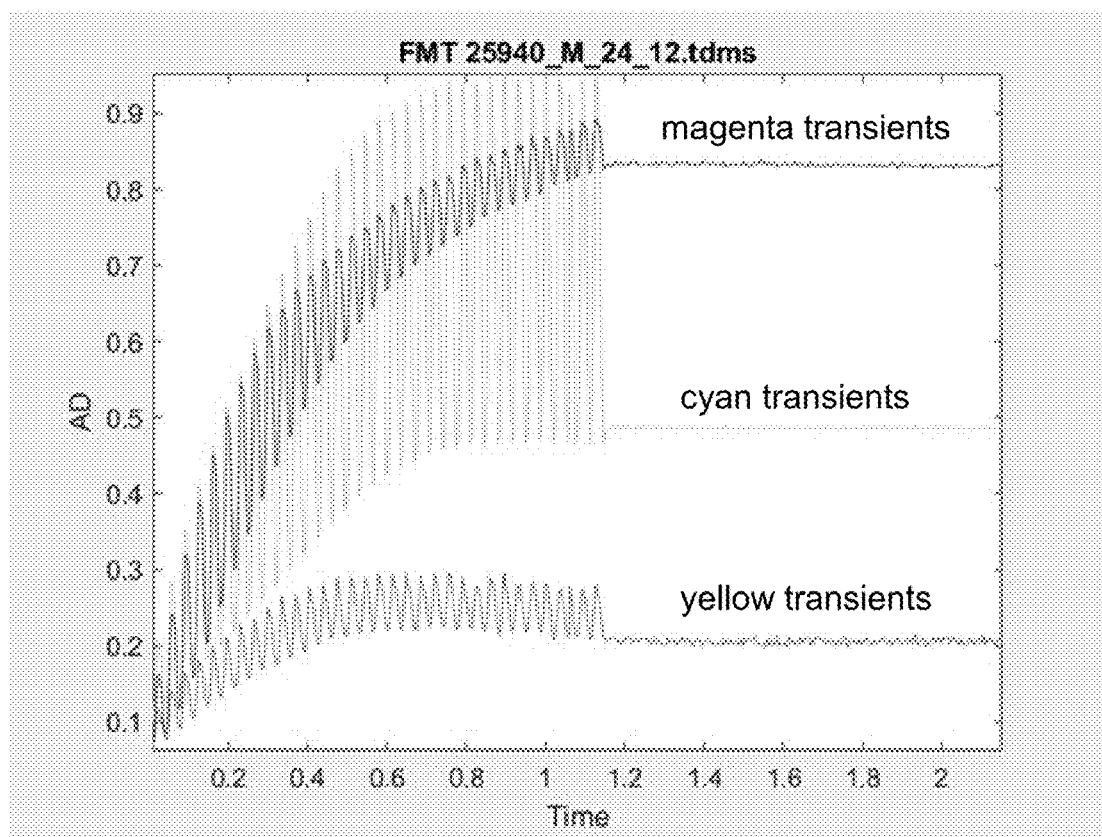
FIG. 8A illustrates the color transients (as measured by color-filtered optical density=analytical density) produced when an electrophoretic display including a white reflective particle and subtractive particles of cyan, yellow, and magenta are addressed with a repeating dipole having a first 5 ms pulse of +24V and a second 10 ms pulse of −12V.
Figure 8B:
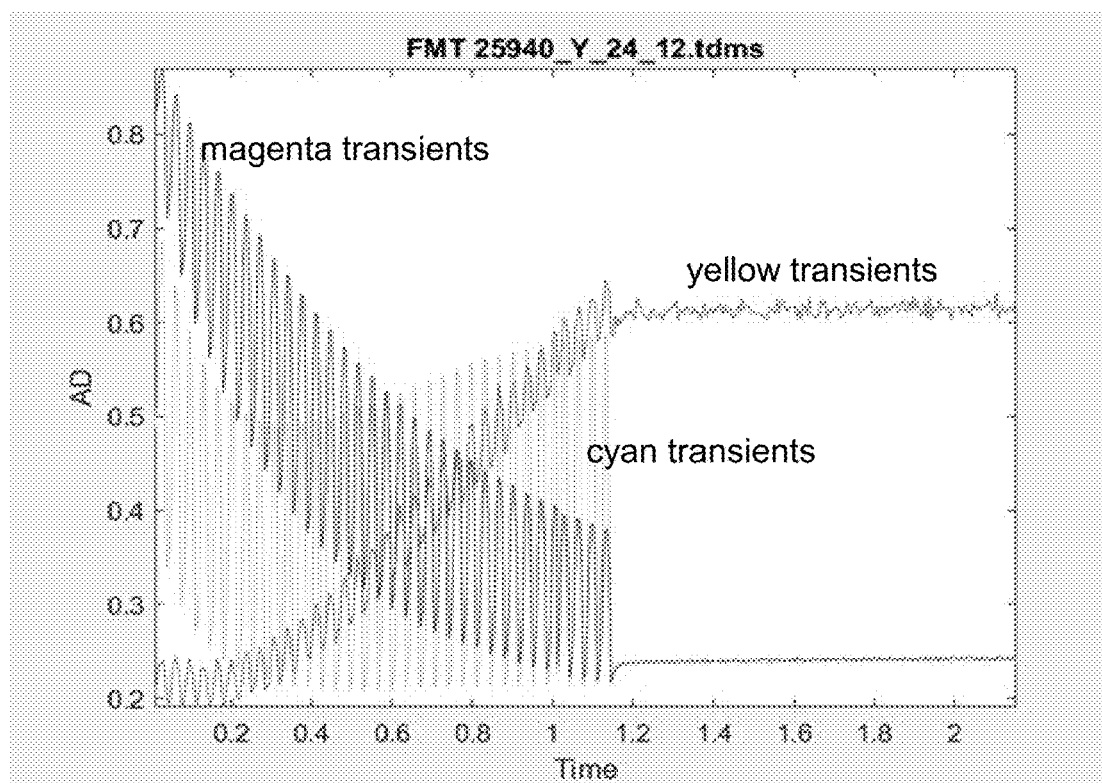
FIG. 8B illustrates the color transients (as measured by color-filtered optical density=analytical density) produced when an electrophoretic display including a white reflective particle and subtractive particles of cyan, yellow, and magenta are addressed with a repeating dipole having a first 5 ms pulse of −24V and a second 10 ms pulse of +12V.

FIGS. 8A and 8B shows the optical transients that occur when a sequence of appropriate dipoles is used to produce limit cycle colors. FIGS. 8A and 8B additionally provide insight into the movement of the multiple differently-charged subtractive particles with respect to each other. The optical transients shown in FIGS. 8A and 8B are described using "analytical density", a metric in which the optical density measured in reflection while the display is being addressed is decomposed into contributions by each of the cyan, magenta and yellow pigments. In FIG. 8A an experimental display starting in the white state is addressed by a sequence of dipoles comprising a first pulse of +24V and 5 ms duration followed by a second pulse of −12V and 10 ms duration. Between the pulses are "rests", periods in which the display is addressed at 0V for 10 ms. These rests are not required to form colors but are necessary to measure the optical densities as the waveform progresses because of limitations of integration of the spectrometer used. As can be seen, using this impulse-balanced sequence of pulses all three color pigments move in phase, but the magenta pigment moves further in the high-voltage pulse of the dipole than it retreats in the low-voltage phase. The cyan pigment moves similarly to the magenta pigment but with a much larger amplitude, while the yellow pigment never becomes significantly visible. Thus, at the end of this sequence of dipoles the display is oscillating between a magenta state (when the cyan pigment retreats) and a blue state (when the cyan pigment advances).

FIG. 8B shows the result when the polarity of the waveform is reversed, i.e., the display is addressed by a sequence of dipoles comprising a first pulse of −24V and 5 ms duration followed by a second pulse of +12V and 10 ms duration separated by rests of 10 ms duration, starting from the endpoint of the waveform that was illustrated in FIG. 8A. Once again all three colored pigments move in phase. The magenta pigment retreats further in the high voltage pulse than it advances during the low voltage pulse, and thus evolves into a position away from the viewing surface. In contrast, the yellow pigment advances further during the low voltage pulse than it retreats during the high voltage pulse, and thus ends up at the viewing surface. The cyan pigment oscillates with a greater amplitude than the other color pigments. At the end of this sequence of dipoles the display is oscillating between a yellow state (when the cyan pigment retreats) and a green state (when the cyan pigment advances).

Figure 9:
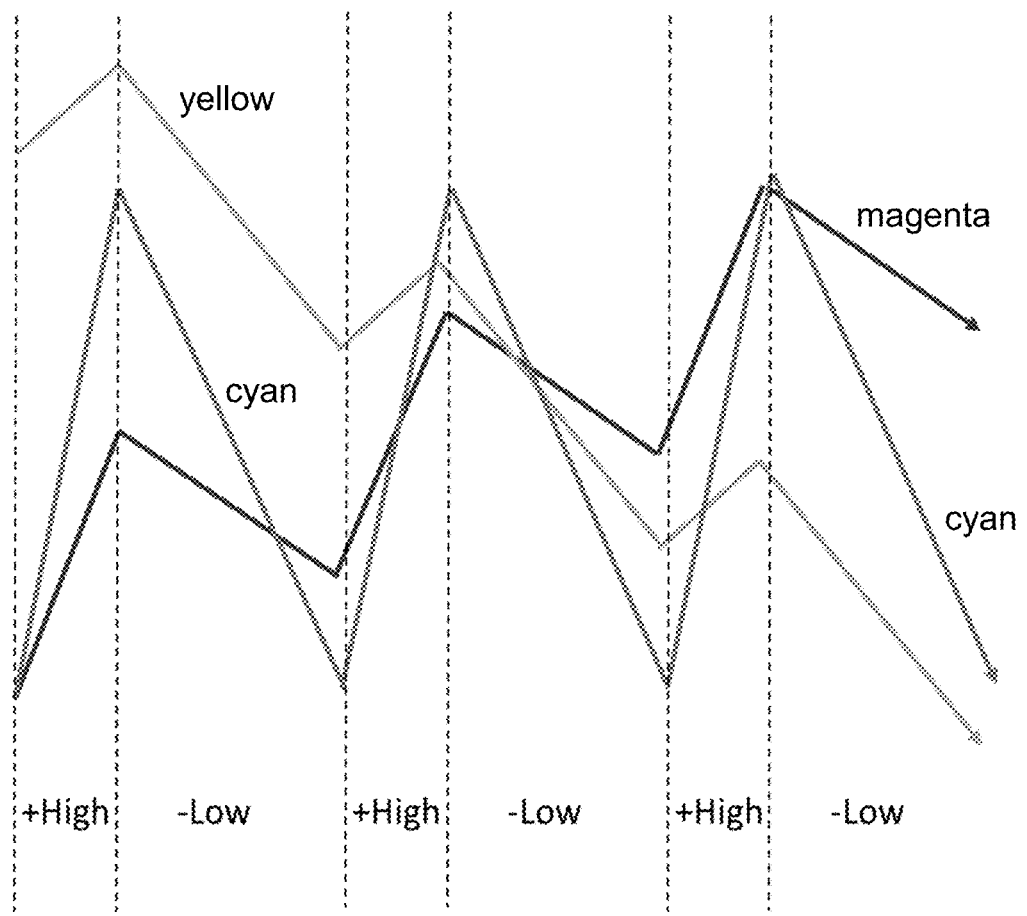
FIG. 9 illustrates smoothed changes in the optical density of the display of FIGS. 8A and 8B for generalized push-pull waveforms.

In a related representation, FIG. 9 shows in schematic form how the analytical density due to each of the three color pigments changes during an approximately impulse-balanced sequence of dipoles of low and high voltage. Importantly, as shown in FIG. 9, the overall length of the transition to one of the limit cycle colors (magenta, yellow, green, blue) is roughly the same no matter the duration of the pulses that comprise a dipole, for example, in the range of approximately 1-200 ms per pulse. Accordingly, it is possible, rather preferred, that the pulse for the limit cycle colors be made as short as possible given the limitations of the electronics, i.e., shorter than about 17 ms, in order to avoid visible flickering during transitions. The preferred ratio of lengths of the two pulses in a dipole is in the range of 1:1-1:10, with the shorter pulse having the higher voltage.

If the higher voltage pulse is positive, the display will oscillate between magenta and cyan. If the higher voltage pulse is negative, the display will oscillate between yellow and green. If the pulses are so short that there is not time for the cyan pigment to reach its preferred position, optionally a "top-up" pulse can be provided at the end of the waveform whose magnitude and duration are adjusted so as to move the cyan but have minimal deleterious impact on the yellow and magenta pigments. Note that the same ratio of pulse durations may be used to produce any of the limit cycle colors. The analytical presentation of FIGS. 8A-9 is broadly applicable to the push pull waveforms of FIG. 6B, and the techniques described below can be used with equal success to decrease the flashing in multi-particle electrophoretic displays having more than one reflective particle.

Offset Gate Pulse Driving

Because of the constancy of the pulse ratios for the limit cycle colors, as well as their insensitivity to the pulse width, an alternative addressing scheme can be used, which provides one full dipole for every two conventional frames of the backplane (conventional frame=time to update each pixel of an active matrix backplane only once in a row-by-row fashion). Such driving is not possible with conventional row-by-row driving of an active matrix backplane using the push pull waveforms of FIG. 6A or 6B, which require at least three frames, typically more. Using the alternative driving, shorter individual voltage pulses can be used, and these shorter pulses result in less physical motion of the pigments, thus the updates do not appear flashy. Accordingly, the display can transition between color images with less flash, which is more pleasing to the viewer. In principle, one of the pulses of the dipole is shorter than the time required to scan every row in the display using conventional row-by-row addressing, i.e., a frame. Further choices of ratios of the two pulse lengths is also possible. In some instances, the entirety of a push pull pulse can be delivered during a conventional frame time, that is the time required to address every pixel from one corner to the diagonal opposite in a row-by-row fashion. Importantly, using the methods of the invention, at least one row of pixel electrodes is updated twice (or more) before every pixel electrode in the active matrix is updated once.

Figure 10:
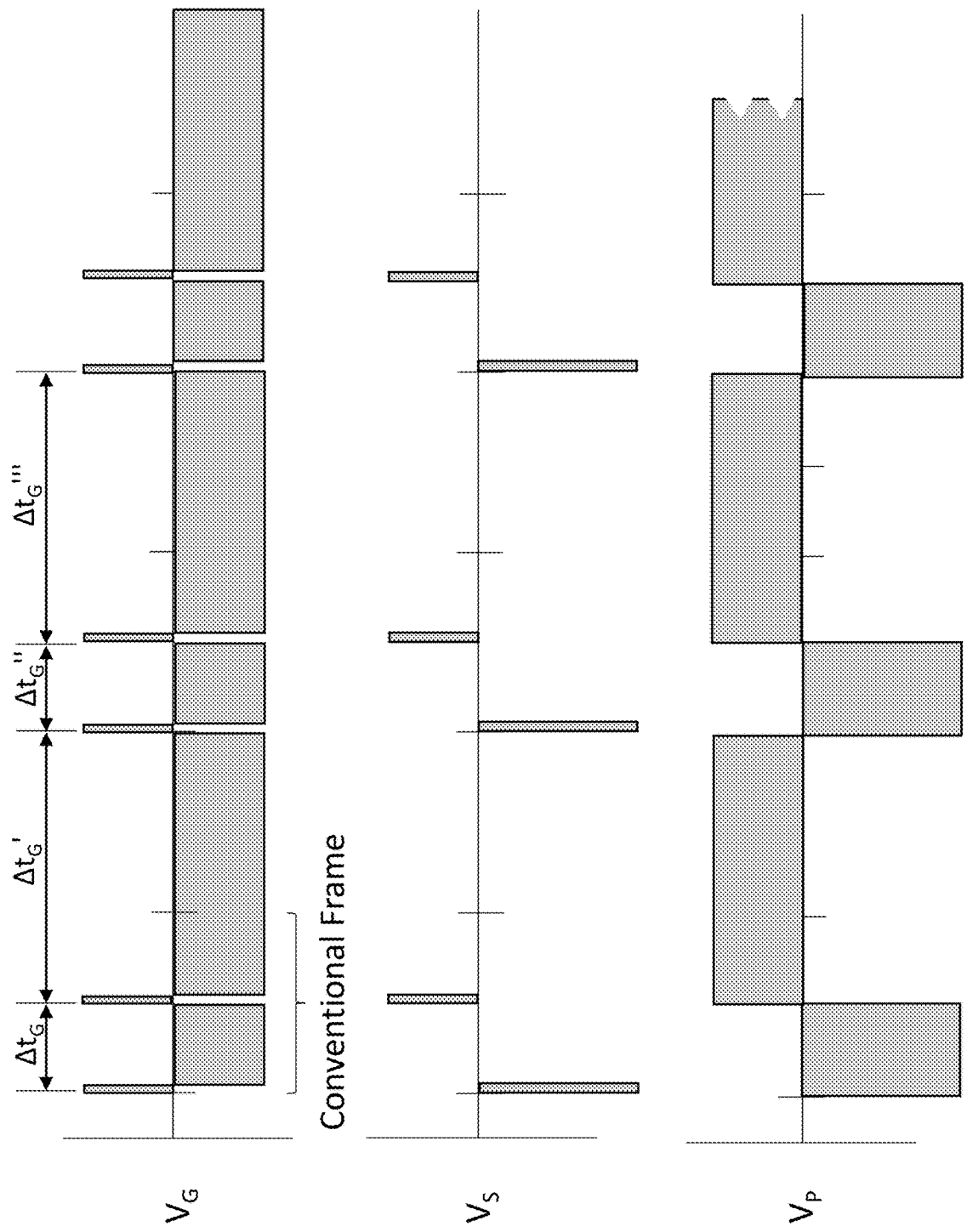
FIG. 10 illustrates the gate voltages ($V_G$) and source voltages ($V_S$) delivered to a thin film transistor coupled to a pixel electrode using a method of the invention. Additionally, the voltage across the electrophoretic medium ($V_P$) is shown. The voltage across the electrophoretic medium is maintained by the storage capacitor associated with each pixel electrode (see FIG. 2).

An exemplary green push-pull waveform (see FIG. 6A) using a drive scheme of the invention is shown in FIG. 10 (which is not drawn to scale). It is understood that FIG. 10 is merely exemplary and the driving methods can be used for other colors and for both subtractive and reflective particle systems. Additionally, the three voltage plots of FIG. 10 all represent voltage provided as a function of time. The space between each hash along the x-axis represents a conventional frame time, i.e., what would be required for traditional row-by-row driving. The invention is not limited to each dipole spanning only two traditional frames, but such dipoles are favored with conventional driving electronics, e.g., controllers. Again, it is possible for all of the pulses of a dipole waveform to be delivered during a single conventional frame using the methods of the invention.

In FIG. 10, $V_G$ shows the voltage provided to one particular gate line of a TFT associated with a pixel electrode. The voltages are ultimately metered by the controller, however an intervening gate driver and/or gate controller may be used (See FIGS. 2 and 3). Whereas in prior art active matrix driving, successive gate voltages have the same time elapsed between each gate pulse during the course of an image update (see FIG. 3), in the new drive scheme the gate voltages are staggered and have different times elapsed ($\Delta tG$) between, e.g., the first and second gate pulse and the second and third gate pulse. Because of the repeating nature of the actual drive signal (see FIG. 7), there is a repetition of the three pulse structure, however the three pulses are not evenly spaced in time, as typical in the state-of-the art driving.

Because of the (relatively) fast gate driving time and because of the storage capacitors associated with the pixel electrodes, when a suitable scan voltage ($V_S$) is provided by the controller to the source line associated with the same TFT, a voltage ($V_P$) is provided across the pixel coupled to that TFT. As shown in the bottom plot, the result of the coordinated gate and scan lines is to provide a push-pull waveform across the pixels in a repeating fashion. In some instances, where the push and the pull pulses have equal area as shown on a V/t plot, the resulting waveform will be DC balanced, however the waveforms need not be DC balanced and in many cases, they will not be DC balanced. As a result of this drive scheme, the push and pull pulses have durations in the ratio 1:3. Both the push and the pull pulses are delivered to a particular row in the time required to update all the rows twice. This is not possible using traditional row-column driving with consistent gate pulse spacing. Because this new push-pull waveform is shorter, it will not be as "flashy."

Figure 11:
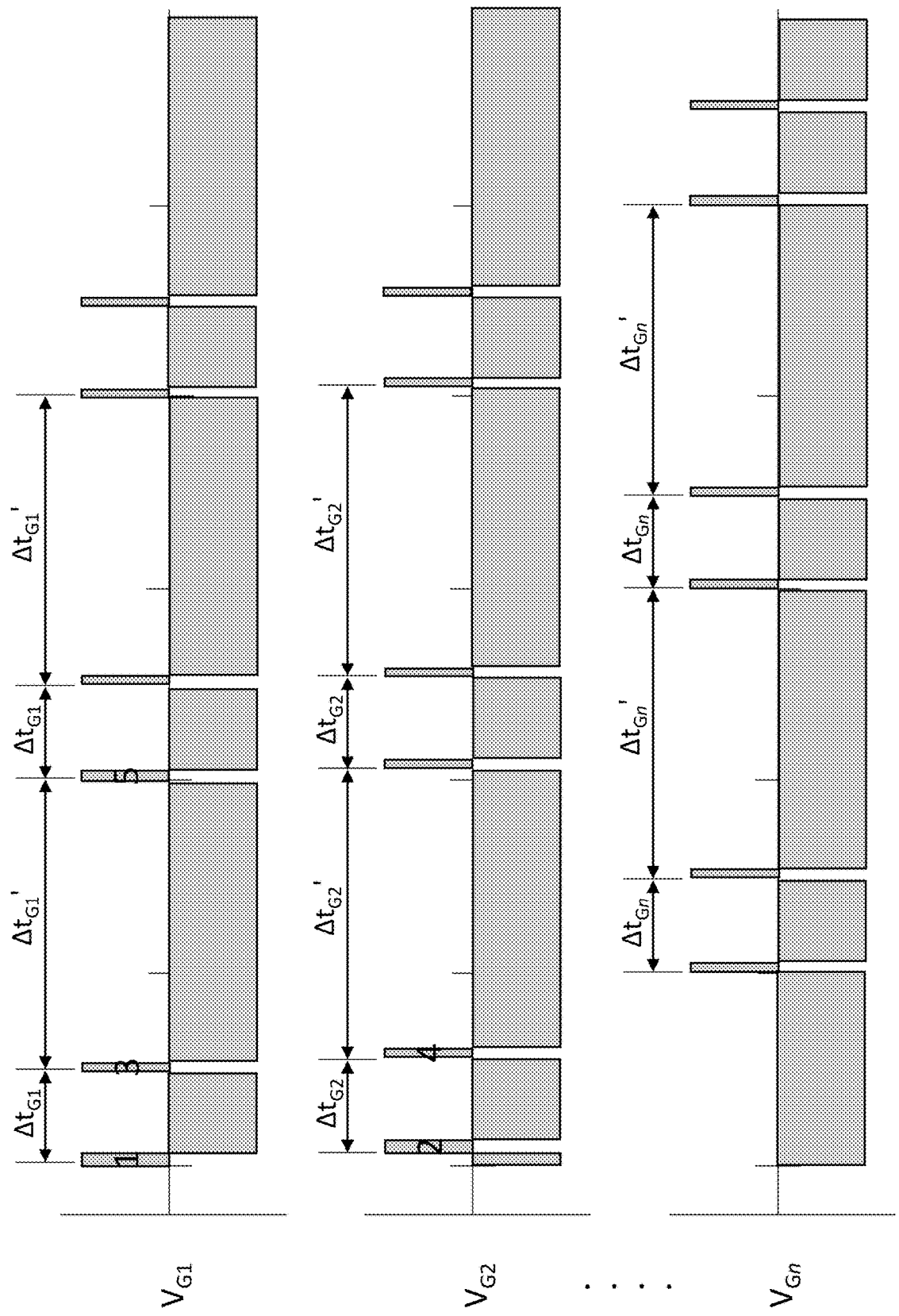
FIG. 11 is a generalized description of the driving methods of the invention, wherein subsequent rows of electrodes are not driven in a typical row-by-row fashion. The driving method results in the three consecutive gate pulses of a single image update not being spaced evenly. In many instances, every pixel of the backplane receives two gate pulses before any pixel receives a third gate pulse.

Using traditional row-column driving, a first gate line (i.e., at the top of the matrix) is addressed, followed by the next row, and then the next, all the way to the nth row, whereupon the process restarts with the first row. As a result, each row of pixels is addressed with gate pulses at a consistent interval. In the method of the invention, however, it is not possible to address every row between the first and second gate pulses of the first row. Accordingly, (depending upon the shape of the push-pull waveform) only some of the rows are updated between the time elapsed between the first and second gate pulses of the first row. For example, as shown in FIG. 11, line 2 does receive a gate pulse between the first and second gate pulses of the first gate line, however later gate lines do not receive a first gate until after the first gate line has received the first and second gate pulses. Accordingly, in at least some embodiments, the rows are divided into two groups (which do not need to be contiguous). The first group of rows is updated twice within a first conventional frame time, while the second group of rows is updated twice within a second conventional frame time. The controller updates the display by providing a first gate voltage (to a first row) at a first time and a second gate voltage (to a second row) at a second time, followed by providing a third gate voltage (to the first row) at a third time and a fourth gate voltage (to a second row) at a fourth time, and finally a fifth gate voltage (to the first row) at a fifth time, and so on. The first and second rows need not be adjacent, and in fact in many instances they will not be adjacent. The first, second, third, fourth, and fifth times are not the same (that is they are not addressed simultaneously), and a time elapsed between the first time and the third time is shorter than a time elapsed between the third time and the fifth time. In many instances, the time elapsed between the third time and the fifth time will be less than 17 ms.

Figure 12:
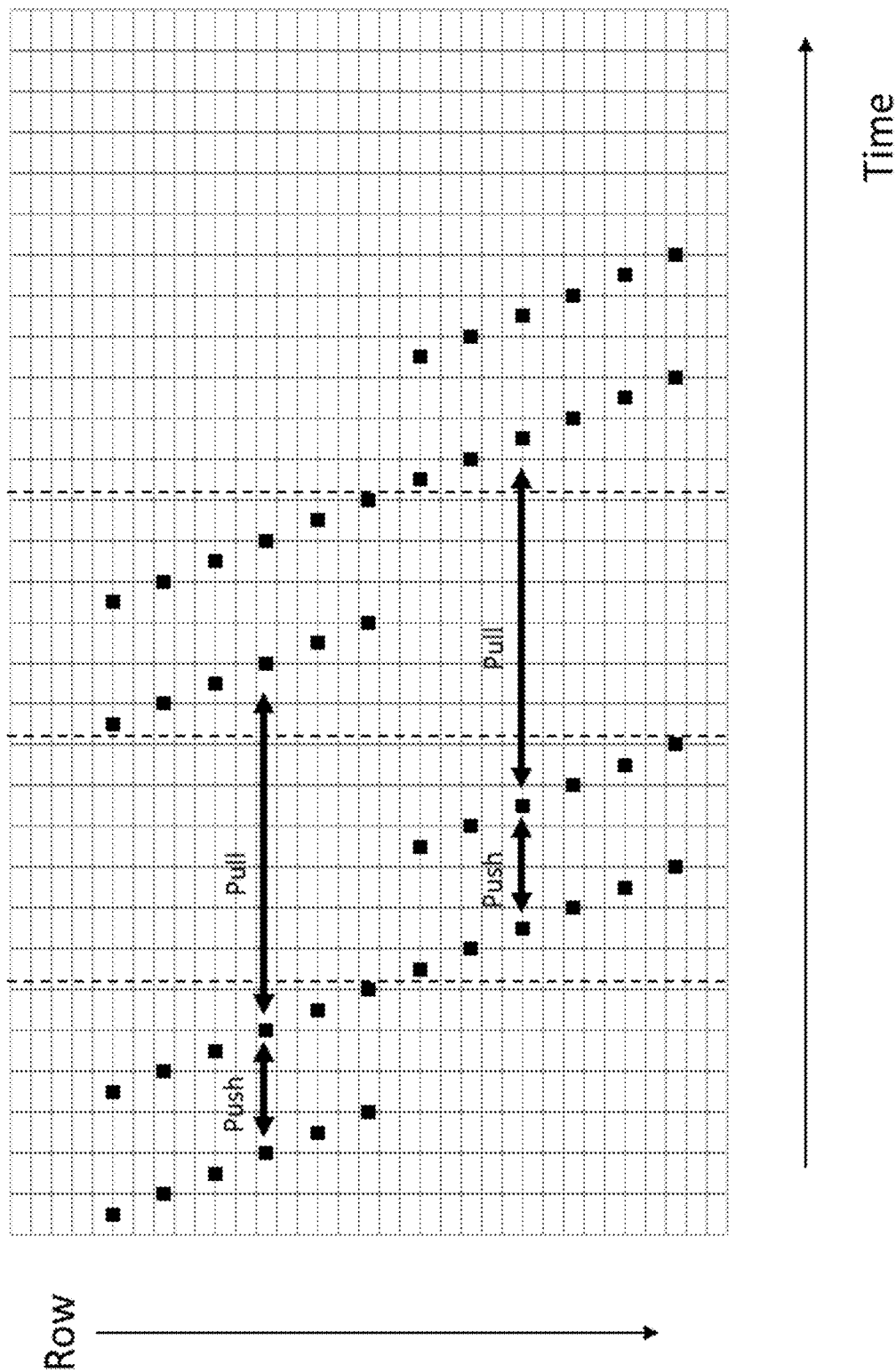
FIG. 12 depicts an embodiment of a low-flash update scheme of the invention.

This driving method is illustrated in FIG. 11, wherein the time elapsed between the first time and the third time is $\Delta t_{G1}'$, and the time elapsed between the third time and the fifth time is $\Delta t_{G1}'$. When the rows are divided into two groups $\Delta t_{G1}'$ is three times longer than $\Delta t_{G1}$. It should be appreciated that FIG. 11 is exemplary for a single push pull waveform delivered to multiple rows of pixels for an update. In other embodiments, $\Delta t_{G1}'$ could be more than three times longer than $\Delta t_{G1}$. The second row, including the second and four times need not be directly adjacent the first row. Additionally, for the entire display (or at least the portion of the display represented in FIG. 11) all of the rows are receiving the same type of sustained repeating waveform required to update that portion of the display to the color requested for the image update or the polar opposite push-pull waveform. Nonetheless, the technique illustrated in FIG. 11 can be used for all of the other limit cycle colors, but the voltages applied to the source lines may different to achieve different colors. For example, the push voltage may be positive or negative and of a high or low magnitude, while the pull voltage will typically be of the opposite polarity but not necessarily the same magnitude. It is also possible, of course, that both voltages have the same polarity, in order to make a longer pulse (of duration twice the frame time). It is possible to use the techniques of the invention to achieve the colors of the rail-bounce states (i.e., red and cyan) by using longer pulses in this way, however if the driving pulses are so short that there is not time for the cyan pigment to reach its preferred position, a "top-up" pulse can be provided at the end of the waveform to move the cyan to the proper position, while having minimal deleterious impact on the yellow and magenta pigments. Additionally, this same drive technique can be used to decrease flashing when updating electrophoretic media comprising reflective particles, i.e., as illustrated in FIG. 6B. In principle, all 8 primary colors of the WCMY system can be rendered without flickering provided that the longer of the two dipole pulses used to address the rail bounce colors is shorter than about 17 ms. Additionally, other colors can be provided by dithering. Dithering may be preferred, for example, if animations, scrolling, etc. are required FIG. 12 shows a first row-scanning scheme using the methods of the invention. Each point in the graph indicates the activation of a particular row. Rather than scan every row of the display before commencing a new backplane scan, in this embodiment the rows are divided into two groups. The first group of rows is scanned twice, after which the second group of rows is scanned twice. In each double scan first the "push" voltage of the dipole is provided by the source driver, appropriate for each column, and then the "pull" voltage is supplied.

The ratio of "push" length to "pull" length is determined by the number of rows in the first and second group to be scanned. If in the first scan the fraction of rows that is scanned is f, the ratio of the "push" length to the "pull" length is f: (2-f). Thus, if f=½, the ratio of pulse lengths is 0.5:1.5=1:3. If there is a fixed time delay between the end of one scan and the beginning of the next, this simply adds a small constant to each number in this ratio.

Figure 13:
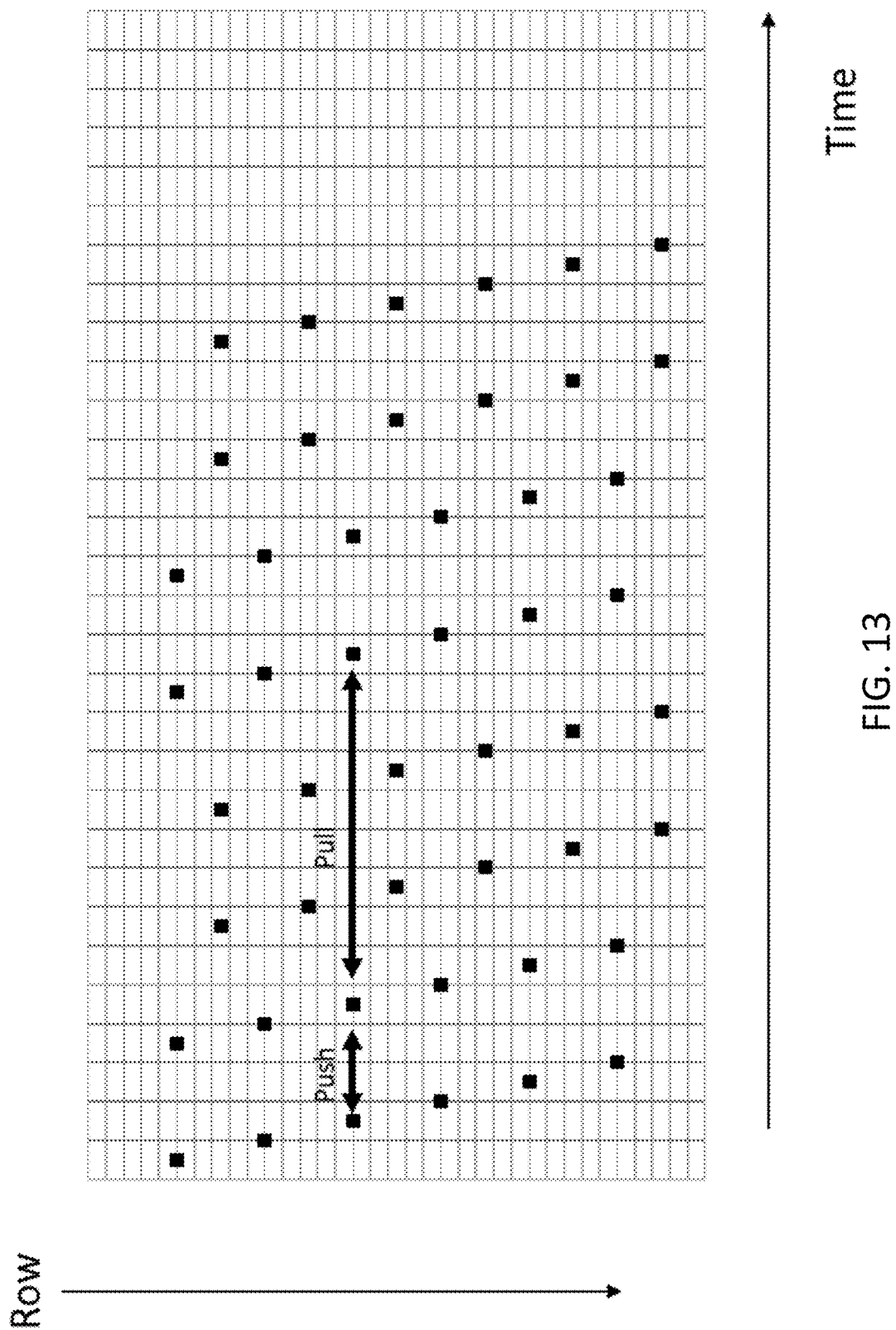
FIG. 13 depicts an embodiment of a low-flash update scheme of the invention.

One possible difficulty of the scheme depicted in FIG. 12 is that there is a "seam" between the top and the bottom portions of the display, in which there is a change in phase of the push and pull portions of the waveform. This seam can be visible in the final image, but will not typically be seen during the update as its frequency is too high. FIG. 13 shows an alternative scheme that can make a 1:3 push: pull ratio without a seam. In this scheme the addressing of every odd line is repeated twice, followed by addressing every even line repeated twice. This gives the same push-pull timing effect as splitting the panel into two equal blocks of consecutive rows.

Figure 14:
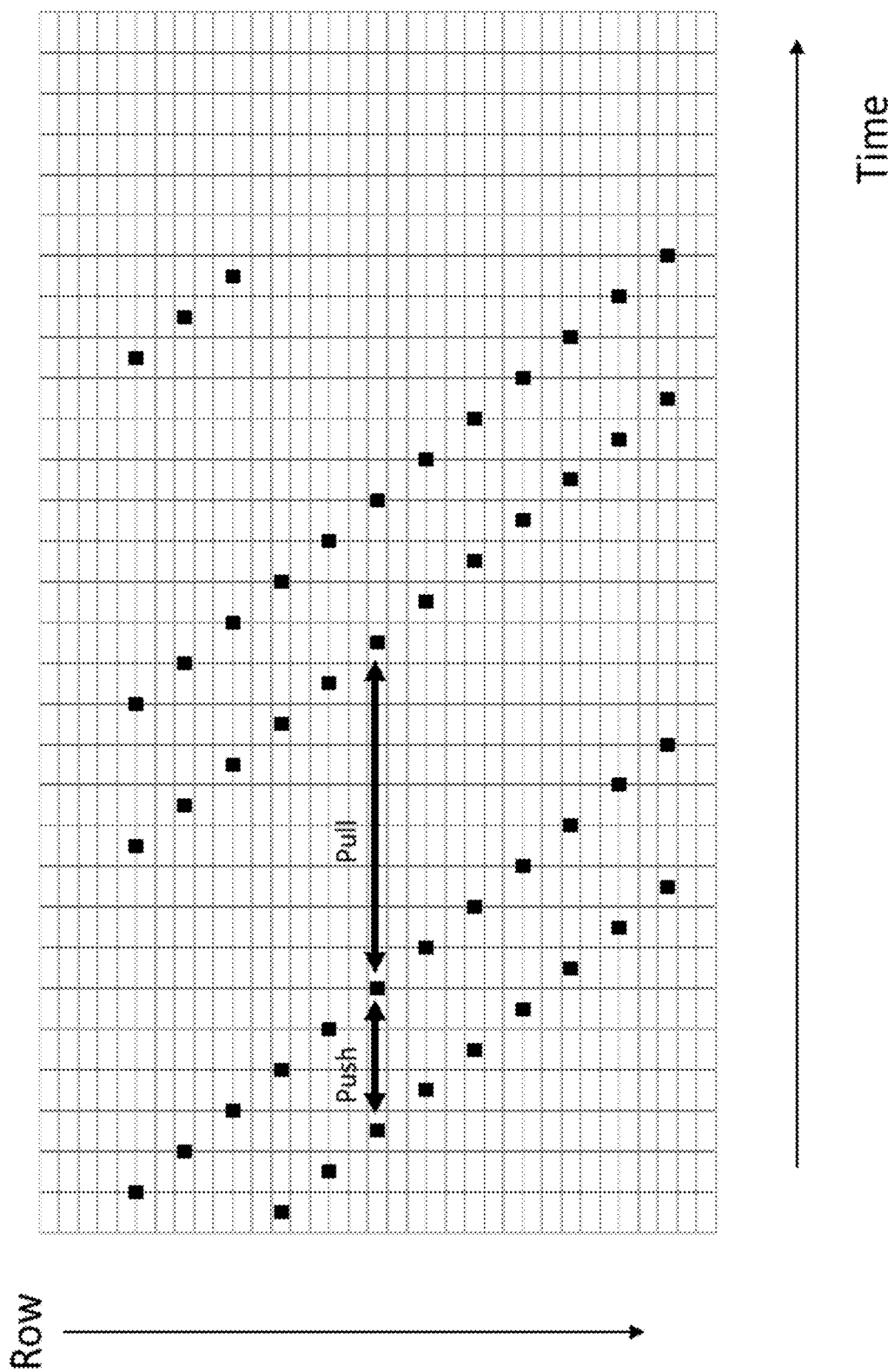
FIG. 14 depicts an embodiment of a low-flash update scheme of the invention.

FIG. 14 shows an additional embodiment of a driving scheme in which the row addressing is interlaced, but in this case there is freedom to choose a wide range of different push: pull ratios. In FIGS. 13 and 14 there is also no "seam" between different sections of the display during the scanning. The driving method of FIG. 14 also lends itself to updating an active matrix display field wherein a number of nearby pixels are transitioning to different colors during the course of an image update.

Figure 15:
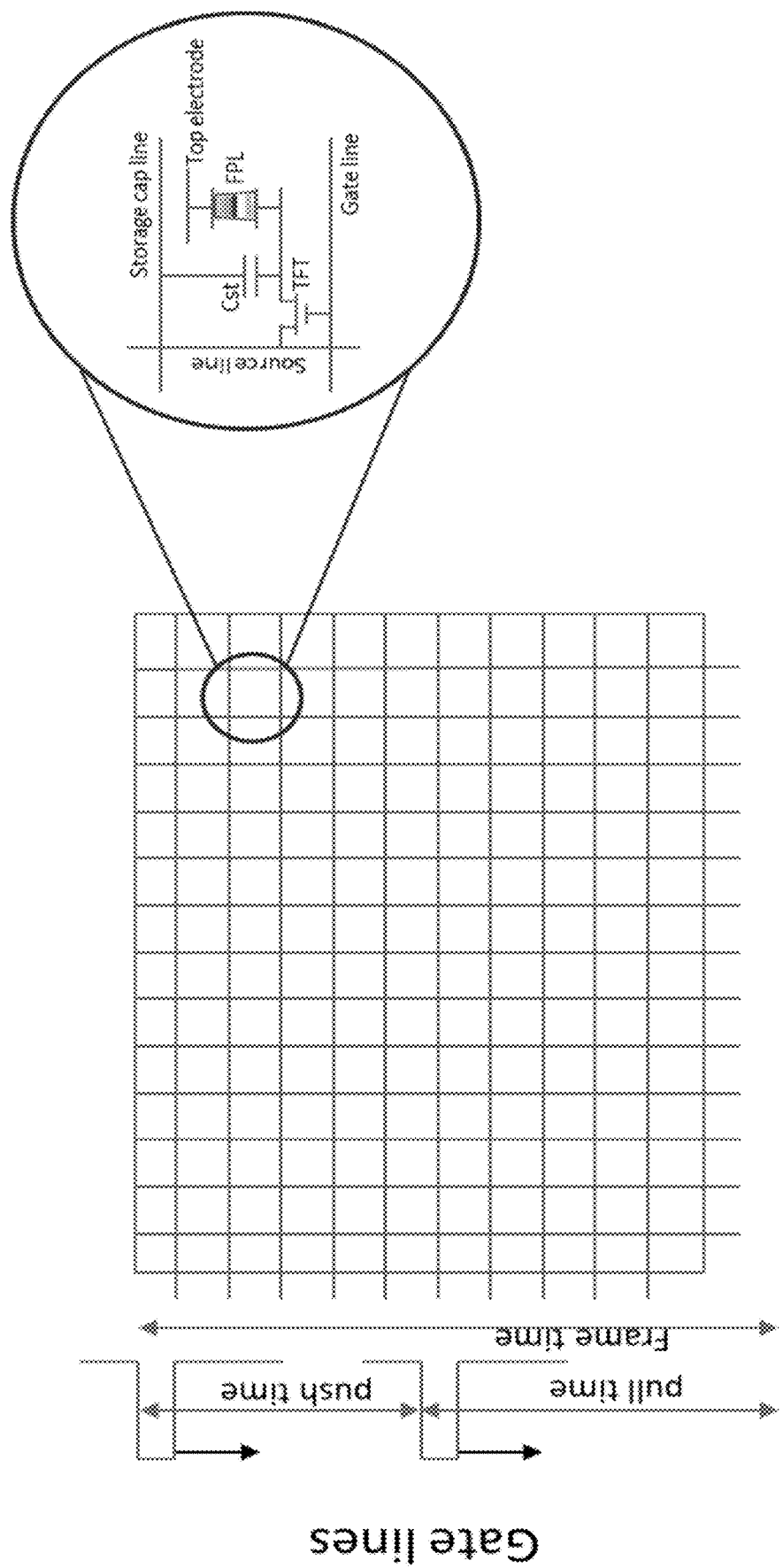
FIG. 15 provides greater details of the drive scheme depicted in FIG. 14.

The drive scheme of FIG. 14 is shown in more detail in FIGS. 15 and 16B. FIG. 15 shows in schematic plan view of an active matrix array of the invention comprising thin film transistors whose transconductances are modulated by a gate voltage supplied by gate lines that span the backplane in the row direction. FIG. 16B shows row n+m is addressed by providing the select voltage to the gate line of row n+m and the non-select voltage to every other row using the gate driver. Appropriate voltages for the first pulses of a dipole (i.e., the "push" of the "push-pull") to be applied to row n+m are supplied to the source lines by the source driver. For simple comparison, traditional row-by-row addressing, which is the state of the art, is shown in FIG. 16A.

Returning to FIG. 16B, after row n+m is addressed, row n is addressed by providing the select voltage to the gate line of row n, and the non-select voltage to every other row using the gate driver. Appropriate voltages for the second pulses of a dipole (i.e., the "pull" of the "push-pull") to be applied to row n are supplied to the source lines by the source driver. Addressing now proceeds to row n+m+1, and so on. At no time is more than one row selected. If the total number of rows in the display is r, the ratio of dipole durations is m/(r−(m+a)), where a is a constant that depends on the delay between frames and is typically much smaller than either r or m.

All of the driving embodiments above can be achieved using a single gate driver adapted to provide this capability, or a combination of synchronized, more conventional gate drivers. It can be seen that, using this design, each row is addressed twice during the elapsed time of one conventional frame, and therefore the row addressing time is half that of a conventional display in which every line is addressed only once during a single frame. In some prior art TFT designs a single gate line connects to two rows of pixels and twice as many source lines are provided such that pixels in two rows are addressed at the same time. Such a design (or other similar designs) may be used to increase the row addressing time. There are less attractive alternatives to the above methods for TFT addressing. For example an array with two TFTs per pixel may be provided, but this would require doubling the number of gate and source lines, increasing cost and possibly imposing more serious resolution limits because of the need to accommodate the additional lines. It would also be possible to use conventional TFT addressing but with alternating frame times of different durations, but in this case it is necessary for the shorter frame time to be equal in duration to the shorter pulse of the dipole, which is not necessary in the present invention, in which the entire dipole has the same duration as the frame time. It can be seen that using this design each row is addressed twice in one frame and therefore the row addressing time is half that of a conventional display in which every line is addressed only once during a single frame. In some prior art TFT designs a single gate line connects to two rows of pixels and twice as many source lines are provided such that pixels in two rows are addressed at the same time. Such a design (or other similar designs) may be used to increase the row addressing time.

The invention allows a non-flashing update of a multipigment color display without requiring very short frame times for addressing the display in a conventional row-by-row fashion. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain, using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. An electrophoretic display comprising:
   a light-transmissive electrode;
   an active matrix backplane comprising a plurality of pixel electrodes, each pixel electrode being coupled to a thin-film transistor comprising a gate line and a source line, and each pixel electrode being coupled to a storage capacitor;
   an electrophoretic medium disposed between the light-transmissive electrode and the active matrix backplane, wherein the electrophoretic medium includes at least three different types of charged pigment particles;
   a controller coupled to a plurality of gate lines of the plurality of pixel electrodes and to a plurality of source lines of the plurality of pixel electrodes, the controller being configured to address the pixel electrodes in a row-by-row fashion;
   the controller further being configured to update an image on the electrophoretic display by performing the following steps:
   address a first row of pixel electrodes by providing a first gate voltage at a first time;
   address a second row of pixel electrodes by providing a second gate voltage at a second time;
   address the first row of pixel electrodes by providing a third gate voltage at a third time;
   address the second row of pixel electrodes by providing a fourth gate voltage at a fourth time; and
   address the first row of pixel electrodes by providing a fifth gate voltage at a fifth time,
   wherein the first, second, third, fourth, and fifth times are not the same, and a time elapsed between the first time and the third time is shorter than a time elapsed between the third time and the fifth time, and
   wherein a portion of electrophoretic medium above a pixel electrode in the first row of pixel electrodes and a portion of the electrophoretic medium above a pixel electrode in the second row of pixel electrodes undergo a same color transition when the controller updates the image.

2. The electrophoretic display of claim 1, wherein the time elapsed between the third time and the fifth time is at least twice as long as the time elapsed between the first time and the third time.

3. The electrophoretic display of claim 1, wherein the time elapsed between the first time and the third time is less than 20 milliseconds.

4. The electrophoretic display of claim 1, wherein the controller simultaneously provides a first source voltage to a pixel of the first row of pixel electrodes at the first time and a second source voltage to the pixel of the first row of pixel electrodes at the third time, and the polarity of the first source voltage and the polarity of the second source voltage are opposite.

5. The electrophoretic display of claim 4, wherein the magnitude of the first source voltage and the magnitude of the second source voltage are different.

6. The electrophoretic display of claim 4, wherein the magnitudes of the first source voltage and the magnitude of the second source voltage are between −24V and +24V.

7. The electrophoretic display of claim 4, wherein the magnitudes of the first source voltage and the magnitude of the second source voltage are between −15V and +15V.

8. The electrophoretic display of claim 4, wherein the controller simultaneously provides a third source voltage to the pixel of the first row of pixel electrodes at the fifth time.

9. The electrophoretic display of claim 8, wherein the first source voltage and the third source voltage have the same polarity and magnitude.

10. The electrophoretic display of claim 1, wherein the controller performs the additional following steps:
   address a third row of pixel electrodes by providing a sixth gate voltage at a sixth time; and
   address the third row of pixel electrodes by providing a seventh gate voltage at a seventh time,
   wherein the first, second, third, fourth, fifth, sixth, and seventh times are not equal, and the time elapsed between the first time and the third time is the same as the time elapsed between the sixth time and the seventh time.

11. The electrophoretic display of claim 1, wherein there are n rows of pixel electrodes in the active matrix backplane, and the first row of pixel electrodes and the second row of pixel electrodes are separated by about n/2 rows of pixel electrodes.

12. The electrophoretic display of claim 11, wherein the controller provides at least two separate gate voltages to each and every thin-film transistor of the active matrix backplane between the first time and the fifth time.

13. The electrophoretic display of claim 1, wherein the electrophoretic medium includes a reflective white particle and at least one subtractive color particle or a reflective white particle and at least one reflective color particle.

14. The electrophoretic display of claim 1, wherein the electrophoretic medium includes a fourth type of electrophoretic particle.

15. The electrophoretic display of claim 14, wherein two of the types of particles are negatively charged and two of the types of particles are positively charged.

16. The electrophoretic display of claim 14, wherein one of the types of particles is negatively charged and three of the types of particles are positively charged.

17. The electrophoretic display of claim 14, wherein three of the types of particles are negatively charged and one of the types of particles is positively charged.

18. The electrophoretic display of claim 1, wherein the electrophoretic medium is encapsulated in microcapsules or microcells.

19. An electrophoretic display comprising:
a light-transmissive electrode;
an active matrix backplane comprising a plurality of pixel electrodes, each pixel electrode being coupled to a thin-film transistor comprising a gate line and a source line, and each pixel electrode being coupled to a storage capacitor;
an electrophoretic medium disposed between the light-transmissive electrode and the active matrix backplane, wherein the electrophoretic medium includes at least three different types of charged pigment particles;
a controller coupled to a plurality of gate lines of the plurality of pixel electrodes and to a plurality of source lines of the plurality of pixel electrodes, the controller being configured to address the pixel electrodes in a row-by-row fashion;
the controller further being configured to update an image on the electrophoretic display by performing the following steps:
address a first row of pixel electrodes by providing a first gate voltage at a first time;
address a second row of pixel electrodes by providing a second gate voltage at a second time, wherein there are n rows of pixel electrodes in the active matrix backplane, and the first row of pixel electrodes and the second row of pixel electrodes are separated by about n/2 rows of pixel electrodes;
address the first row of pixel electrodes by providing a third gate voltage at a third time;
address the second row of pixel electrodes by providing a fourth gate voltage at a fourth time; and
address the first row of pixel electrodes by providing a fifth gate voltage at a fifth time,
wherein the first, second, third, fourth, and fifth times are not the same, and a time elapsed between the first time and the third time is shorter than a time elapsed between the third time and the fifth time.

20. The electrophoretic display of claim 19, wherein the time elapsed between the third time and the fifth time is at least twice as long as the time elapsed between the first time and the third time.

21. The electrophoretic display of claim 19, wherein the time elapsed between the first time and the third time is less than 20 milliseconds.

22. The electrophoretic display of claim 19, wherein the controller simultaneously provides a first source voltage to a pixel of the first row of pixel electrodes at the first time and a second source voltage to the pixel of the first row of pixel electrodes at the third time, and the polarity of the first source voltage and the polarity of the second source voltage are opposite.

23. The electrophoretic display of claim 22, wherein the magnitude of the first source voltage and the magnitude of the second source voltage are different.

24. The electrophoretic display of claim 22, wherein the magnitudes of the first source voltage and the magnitude of the second source voltage are between −24V and +24V.

25. The electrophoretic display of claim 22, wherein the magnitudes of the first source voltage and the magnitude of the second source voltage are between −15V and +15V.

26. The electrophoretic display of claim 22, wherein the controller simultaneously provides a third source voltage to the pixel of the first row of pixel electrodes at the fifth time.

27. The electrophoretic display of claim 26, wherein the first source voltage and the third source voltage have the same polarity and magnitude.

28. The electrophoretic display of claim 19, wherein the controller performs the additional following steps:
address a third row of pixel electrodes by providing a sixth gate voltage at a sixth time; and
address the third row of pixel electrodes by providing a seventh gate voltage at a seventh time,
wherein the first, second, third, fourth, fifth, sixth, and seventh times are not equal, and the time elapsed between the first time and the third time is the same as the time elapsed between the sixth time and the seventh time.

29. The electrophoretic display of claim 19, wherein the controller provides at least two separate gate voltages to each and every thin-film transistor of the active matrix backplane between the first time and the fifth time.

30. The electrophoretic display of claim 19, wherein the electrophoretic medium includes a reflective white particle and at least one subtractive color particle or a reflective white particle and at least one reflective color particle.

31. The electrophoretic display of claim 19, wherein the electrophoretic medium includes a fourth type of electrophoretic particle.

32. The electrophoretic display of claim 31, wherein two of the types of particles are negatively charged and two of the types of particles are positively charged.

33. The electrophoretic display of claim 31, wherein one of the types of particles is negatively charged and three of the types of particles are positively charged.

34. The electrophoretic display of claim 31, wherein three of the types of particles are negatively charged and one of the types of particles is positively charged.

35. The electrophoretic display of claim 19, wherein the electrophoretic medium is encapsulated in microcapsules or microcells.

* * * * *